United States Patent
Lee et al.

(10) Patent No.: US 12,476,666 B2
(45) Date of Patent: Nov. 18, 2025

(54) ELECTRONIC DEVICE INCLUDING ANTENNA MODULES AND OPERATION METHOD THEREOF

(71) Applicant: SAMSUNG ELECTRONICS CO., LTD., Suwon-si (KR)

(72) Inventors: Youngmin Lee, Suwon-si (KR); Hyoseok Na, Suwon-si (KR); Hanyeop Lee, Suwon-si (KR); Hyunseok Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 429 days.

(21) Appl. No.: 18/058,510

(22) Filed: Nov. 23, 2022

(65) Prior Publication Data

US 2023/0088646 A1    Mar. 23, 2023

Related U.S. Application Data

(63) Continuation of application No. PCT/KR2021/006582, filed on May 27, 2021.

(30) Foreign Application Priority Data

May 27, 2020    (KR) ..................... 10-2020-0063884

(51) Int. Cl.
*H04B 1/525*    (2015.01)
*H04B 1/16*    (2006.01)

(52) U.S. Cl.
CPC ........... *H04B 1/525* (2013.01); *H04B 1/1607* (2013.01)

(58) Field of Classification Search
CPC ...... H04B 1/16; H04B 1/1607; H04B 1/1615; H04B 1/40; H04B 1/401; H04B 1/50;
(Continued)

(56) References Cited

U.S. PATENT DOCUMENTS

| 6,487,419 | B1 | 11/2002 | Freed |
| 8,812,052 | B2 * | 8/2014 | Xu ..................... H04B 7/18513 455/552.1 |

(Continued)

FOREIGN PATENT DOCUMENTS

| JP | 2003-69440 | 3/2003 |
| JP | 2006-197368 | 7/2006 |

(Continued)

OTHER PUBLICATIONS

Korean Office Action dated Jan. 10, 2024 for KR Application No. 10-2020-0063884.

(Continued)

*Primary Examiner* — Quochien B Vuong
(74) *Attorney, Agent, or Firm* — NIXON & VANDERHYE P.C.

(57) ABSTRACT

An electronic device may include a transceiver, a communication circuit, at least one antenna circuit, a processor, and a memory. The transceiver may include at least one transmission (Tx) chain and at least one reception (Rx) chain. The communication circuit may include a plurality of front ends electrically connected to the transceiver. The at least one antenna circuit may be connected to the plurality of front ends, respectively. The processor may be operatively connected to the communication circuit. The processor is configured to change the power and/or circuit driving of the at least one reception (Rx) chain on the basis of the strength of an output signal of the at least one transmission chain.

19 Claims, 16 Drawing Sheets

(58) Field of Classification Search
CPC .......... H04B 1/52; H04B 1/525; H04M 1/02; H04M 1/0206; H04M 1/0214; H04M 1/0216; H04M 1/0222

See application file for complete search history.

(56) References Cited

U.S. PATENT DOCUMENTS

| | | | |
|---|---|---|---|
| 9,094,104 B2 | 7/2015 | Din et al. | |
| 9,736,790 B1 | 8/2017 | Haub et al. | |
| 9,912,358 B2 | 3/2018 | Pratt et al. | |
| 10,659,121 B2 * | 5/2020 | Pehlke | H04B 7/0413 |
| 11,212,758 B2 | 12/2021 | Charipadi et al. | |
| 11,444,706 B2 | 9/2022 | Yang et al. | |
| 11,558,079 B2 * | 1/2023 | Raghavan | H04B 1/0475 |
| 12,034,467 B2 * | 7/2024 | Kim | H04B 1/0057 |
| 2004/0077324 A1 | 4/2004 | Wieck | |
| 2009/0154377 A1 | 6/2009 | Tsuda et al. | |
| 2012/0231729 A1 | 9/2012 | Xu et al. | |
| 2013/0084880 A1 | 4/2013 | Lee et al. | |
| 2013/0189969 A1 | 7/2013 | Periyalwar et al. | |
| 2013/0266045 A1 | 10/2013 | Lakkis | |
| 2014/0073281 A1 | 3/2014 | Judson et al. | |
| 2014/0097905 A1 | 4/2014 | Xu et al. | |
| 2018/0227009 A1 | 8/2018 | Petrovic et al. | |

FOREIGN PATENT DOCUMENTS

| | | |
|---|---|---|
| JP | 2007-295436 | 11/2007 |
| JP | 2008-160483 | 7/2008 |
| KR | 2001-0072268 | 7/2001 |
| KR | 10-0789784 | 12/2007 |
| KR | 10-2009-0115813 | 11/2009 |
| KR | 10-2009-0115813 A | 11/2009 |
| KR | 10-2020-0046344 | 5/2020 |
| KR | 10-2362682 | 2/2022 |
| WO | 2014/008918 | 1/2014 |

OTHER PUBLICATIONS

Korean Notice of Patent Grant dated Sep. 24, 2024 for KR Application No. 10-2020-0063884.

* cited by examiner front end 1 : EN-DC (LTE Tx/PRX + NR DRX2)
front end 2 : EN-DC (LTE PRX + NR DRX)
front end 3 : EN-DC (LTE DRX2 + NR Tx/PRX)
front end 4 : EN-DC (LTE DRX + NR PRX2)

ELECTRONIC DEVICE INCLUDING ANTENNA MODULES AND OPERATION METHOD THEREOF

CROSS-REFERENCE TO RELATED APPLICATIONS

This application is a continuation of International Application No. PCT/KR2021/006582, filed on May 27, 2021, designating the United States, in the Korean Intellectual Property Receiving Office, and claiming priority to 10-2020-0063884, filed May 27, 2020, the disclosures of which are all hereby incorporated by reference herein in their entireties.

BACKGROUND

Field

Various example embodiments relate to an electronic device including a plurality of antenna modules, each including at least one antenna, and/or a method of operating the same.

Description of Related Art

In order to meet wireless data traffic demands that have increased after $4^{th}$-generation (4G) communication system commercialization, efforts to commercialize a next-generation ($5^{th}$-generation or pre-5G) communication system have been made. For example, the 5G communication system or the pre-5G communication system is called a beyond 4G network communication system or a post-LTE system. Electronic devices may include a plurality of antennas and front ends for supporting various wireless communication systems (for example, an LTE communication system, a 5G communication system, and a Wi-Fi communication system).

SUMMARY

When an electronic device outputs transmission signals through a transmission (Tx) path, some of the Tx output signals may leak and flow into Rx chains. The Rx chains may be configured to process leaked Tx signals having the high strength in order to prevent or reduce deterioration of the signal processing performance due to the flowing transmission signals. Accordingly, high current consumption may be generated in the Rx chains.

Various example embodiments may provide an electronic device and a method of controlling the same capable of reducing current consumption of the reception chains by controlling configurations of at least some of the circuits included in the reception chains according to the strength of the transmission signals of the transmission chains.

An electronic device according to various example embodiments may include a transceiver, a communication module (or, communication circuit) comprising communication circuitry, at least one antenna module (or, antenna circuit) comprising at least one antenna, a processor comprising processing circuitry, and a memory. The transceiver may include at least one transmission (Tx) chain and at least one reception (Rx) chain. The communication module (or, communication circuit) may include a plurality of front ends electrically connected, directly or indirectly, to the transceiver. The at least one antenna module may be connected, directly or indirectly, to the plurality of front ends. The processor may be operatively connected, directly or indirectly, to the communication module. The memory may be operatively connected, directly or indirectly, to the processor. The memory may cause the processor to, when executed, change power of the at least one reception (Rx) chain and/or change circuit driving on the basis of the strength of the output signals of the at least one transmission chain.

According to various example embodiments, it is possible to reduce current consumption of transmission chains at least by controlling configurations of at least some of the circuits included in the reception chains according to power of the transmission signals of the transmission chains.

According to various example embodiments, it is possible to reduce current consumption of reception chains at least by controlling configurations of at least some of the circuits included in the reception chains according to whether a Wi-Fi and/or Bluetooth module is driven.

According to various example embodiments, it is possible to reduce current consumption of reception chains at least by controlling configurations of at least some of the circuits included in the reception chains according to folding of the electronic device.

Further, various effects directly or indirectly detected through the disclosure can be provided.

BRIEF DESCRIPTION OF DRAWINGS

The above and other aspects, features, and advantages of certain example embodiments will be more apparent from the following detailed description, taken in conjunction with the accompanying drawings, in which.

In connection with description of drawings, the same or similar reference numerals may be used for the same or similar elements.

DETAILED DESCRIPTION

Hereinafter, various embodiments will be described in detail with reference to the accompanying drawings.

Figure 1:
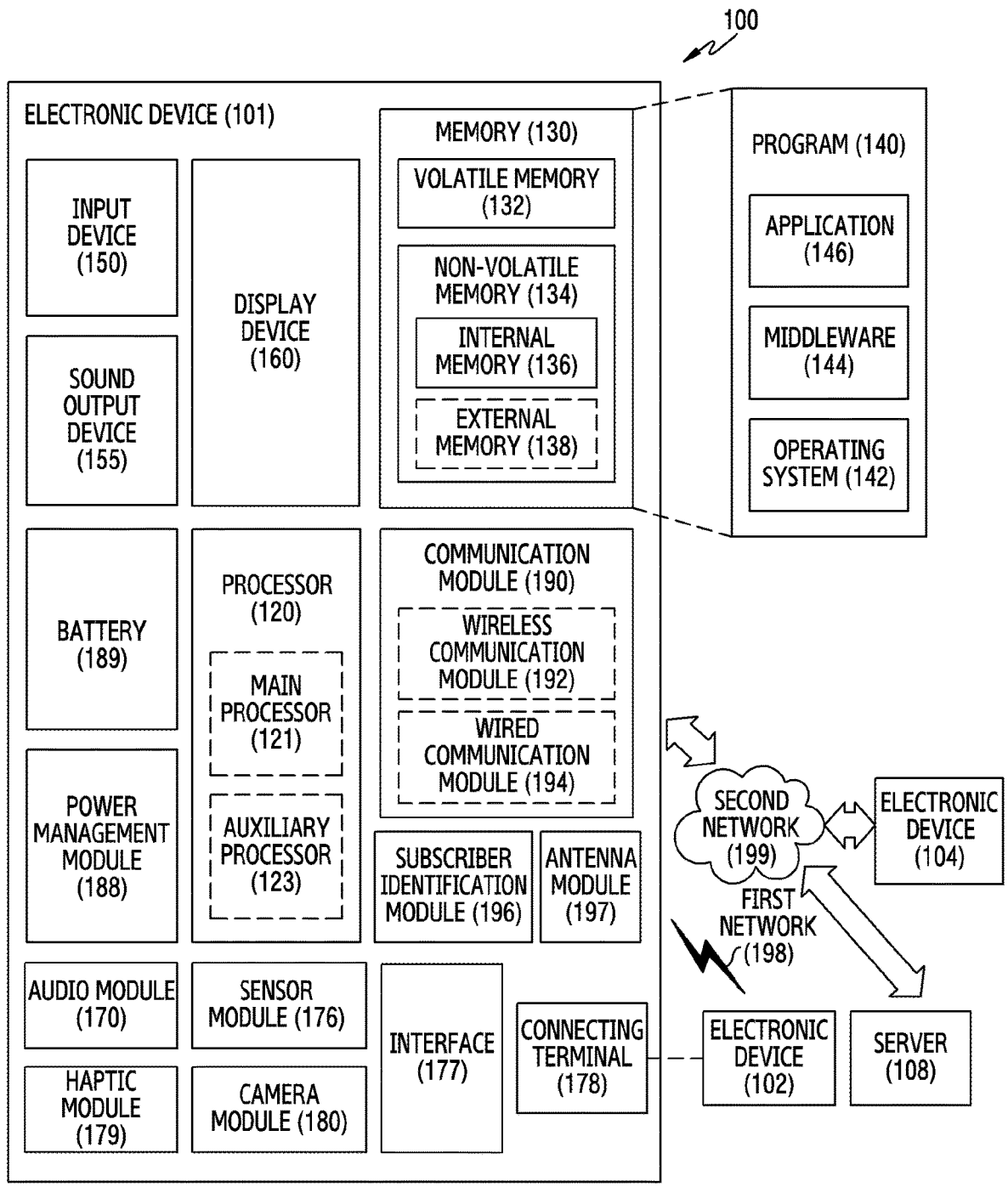
FIG. 1 is a block diagram of an electronic device within a network environment according to various example embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module(SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to an example embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an example embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190, comprising communication circuitry, may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197, comprising at least one antenna, may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
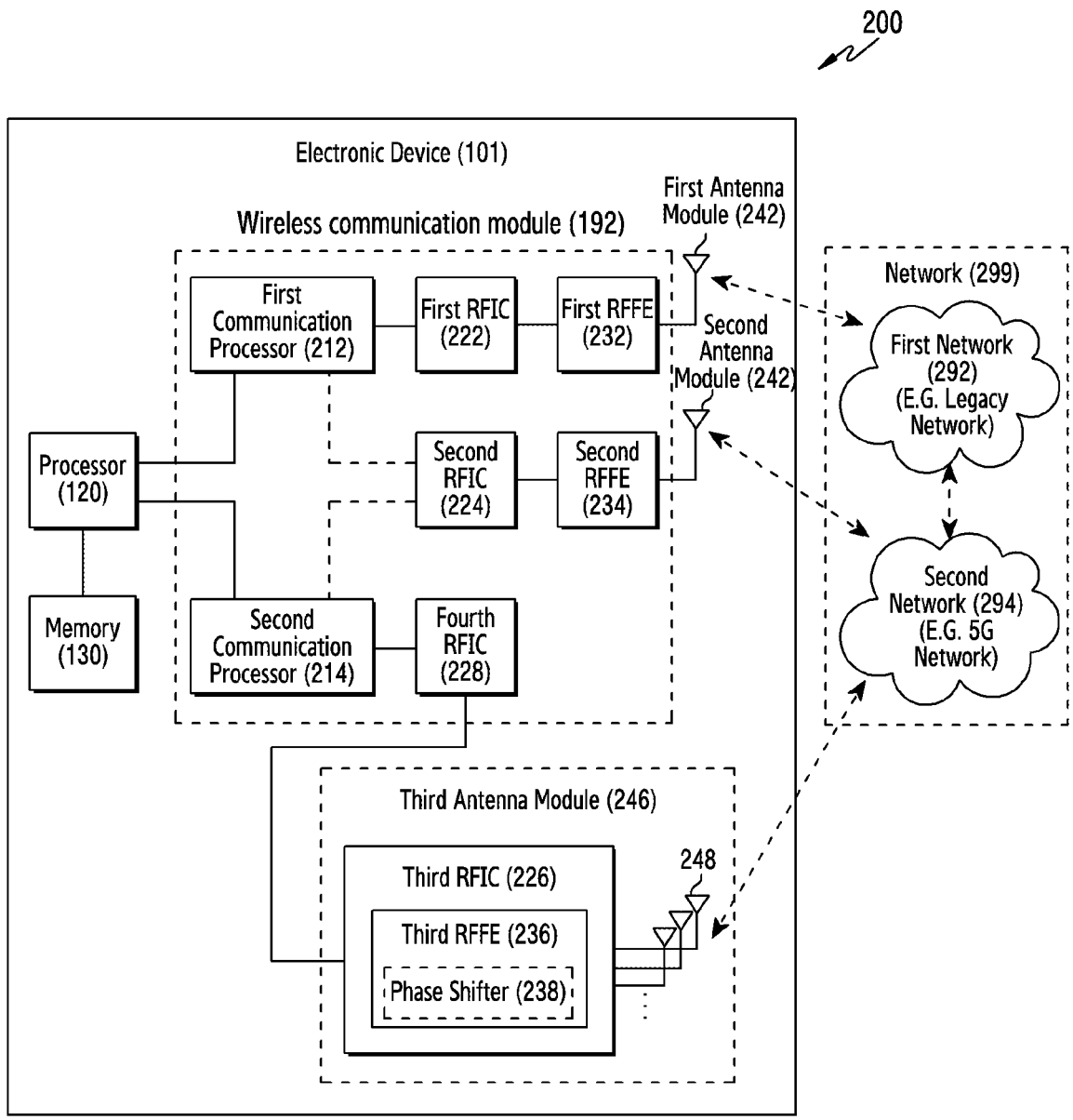
FIG. 2 is a block diagram of a communication module supporting communication of the electronic device with a plurality of wireless networks according to various example embodiments.

FIG. 2 is a block diagram illustrating a communication module (or, communication circuit) 200, comprising communication circuitry, in the electronic device 101 for supporting communication with a plurality of wireless networks according to various embodiments.

Referring to FIG. 2, the electronic device 101 may include a first CP 212, a second CP 214, a first RFIC 222, a second RFIC 224, a third RFIC 226, a fourth RFIC 228, a first radio frequency front end (RFFE) 232, a second RFFE 234, a first antenna module (or, first antenna circuit) 242, a second antenna module (or, second antenna circuit) 244, and antennas 248. Each antenna module herein comprises at least one antenna. The electronic device 101 may further include the processor 120 and the memory 130. A second network 199 may include a first cellular network 292 and a second cellular network 294. According to another embodiment, the electronic device 101 may further include at least one element among the elements illustrated in FIG. 1, and the second network 199 may further include at least one other network. According to an embodiment, the first CP 212, the second CP 214, the first RFIC 222, the second RFIC 224, the fourth RFIC 228, the first RFFE 232, and the second RFFE 234 may configure at least a portion of the wireless communication module 192. According to another embodiment, the fourth RFIC 228 may be omitted or may be included as a portion of the third RFIC 226.

The first CP 212 may support establishment of a communication channel in a band to be used for wireless communication with the first cellular network 292 and legacy network communication through the established communication channel According to various embodiments, the first cellular network 292 may be a legacy network including a second generation (2G), 3G, 4G, or long-term evolution (LTE) network. The second CP 214 may support establishment of a communication channel corresponding to a predetermined band (for example, about 6 GHz to about 60 GHz) among the bands to be used for wireless communication with the second cellular network 294 and support 5G network communication through the established communication channel. According to various embodiments, the second cellular network 294 may be a 5G network defined by the 3GPP. In addition, according to an embodiment, the first CP 212 or the second CP 214 may support establishment of a communication channel corresponding to another predetermined band (for example, equal to or lower than about 6 GHz) among the bands to be used for wireless communication with the second cellular network 294 and 5G network communication through the established communication channel. According to an embodiment, the first CP 212 and the second CP 214 may be implemented within a single chip or a single package. According to various embodiments, the first CP 212 or the second CP 214 may be configured within a single chip or a single package together with the processor 120, the auxiliary processor 123, or the communication module (or, communication circuit) 190. Each communication module herein comprises communication circuitry. According to an embodiment, the first CP 212 and the second CP 214 may be directly or indirectly connected to each other by an interface (not shown) and may provide or receive data or a control signal unidirectionally or bidirectionally.

In transmission, the first RFIC 222 may convert a baseband (BB) signal generated by the first CP 212 into a radio frequency (RF) signal from about 700 MHz to about 3 GHz used for the first cellular network 292 (for example, legacy network). In reception, the RF signal may be acquired from the first cellular network 292 (for example, legacy network) through an antenna (for example, the first antenna module (or, first antenna circuit) 242) and may be preprocessed through the RFFE (for example, first RFFE 232). The first RFIC 222 may convert the preprocessed RF signal into a BB signal to be processed by the first CP 212.

In transmission, the second RFIC 224 may convert a BB signal generated by the first CP 212 or the second CP 214 into an RF signal (hereinafter, referred to as a 5G Sub6 RF signal) in a Sub6 band (for example, equal to or lower than about 6 GHz) used for the second cellular network 294 (for example, 5G network). In reception, a 5G Sub6 RF signal may be acquired from the second cellular network 294 (for example, 5G network) through an antenna (for example, the second antenna module (or, second antenna circuit) 244) and may be preprocessed through the RFFE (for example, second RFFE 234). The second RFIC 224 may convert the preprocessed 5G Sub6 RF signal into a BB signal to be processed by the corresponding CP among the first CP 212 or the second CP 214.

In transmission, the third RFIC 226 may convert a BB signal generated by the second CP 214 into an RF signal (hereinafter, referred to as a 5G Above6 RF signal) in a 5G Above6 band (for example, from about 6 GHz to about 60 GHz) to be used for the second cellular network 294 (for example, the 5G network). In reception, the third RFIC 226 may preprocess the 5G Above6 RF signal acquired from the second cellular network 294 (for example, 5G network) through the antenna (for example, antenna 248) and convert the preprocessed 5G Above6 RF signal into a BB signal to be processed by the second CP 214. According to an embodiment, the third RFFE 236 may be configured as a portion of the third RFIC 226.

The electronic device 101 may include the fourth RFIC 228 separately from the third RFIC 226 or as at least a portion thereof. In this case, after converting the BB signal generated by the second CP 214 into an RF signal (hereinafter, referred to as an IF signal) in an intermediate frequency (IF) band (for example, about 9 GHz to about 11 GHz), the fourth RFIC 228 may transmit the IF signal to the third RFIC 226. The third RFIC 226 may convert the IF signal into a 5G Above6 RF signal. In reception, the 5G Above6 RF signal may be received from the second cellular network 294 (for example, 5G network) through the antenna (for example, antenna 248) and converted into an IF signal by the third RFIC 226. The fourth RFIC 228 may convert the IF signal into a BB signal to be processed by the second CP 214.

According to an embodiment, the first RFIC 222 and the second RFIC 224 may be implemented as at least a portion of a single chip or a single package. According to an embodiment, the first RFFE 232 and the second RFFE 234 may be implemented as at least a portion of a single chip or a single package. According to an embodiment, at least one of the first antenna module 242 or the second antenna module 244 may be omitted or combined with another antenna module to process RF signals in a plurality of corresponding frequency bands.

According to an embodiment, the third RFIC 226 and the antenna 248 may be disposed on the same substrate to configure a third antenna module 246. For example, the wireless communication module 192 or the processor 120 may be disposed on a first substrate (for example, a main PCB or a first printed circuit board). In this case, the third RFIC 226 may be disposed in a partial area (for example, bottom side) of a second substrate (for example, a sub PCB or a second printed circuit board) separated from the first substrate and the antennas 248 may be disposed in another partial area (for example, top side) to configure the third antenna module 246. By placing the third RFIC 226 and the antennas 248 on the same substrate, it is possible to reduce the length of a transmission line therebetween. This is to reduce loss (for example, attenuation) of the signal in a high frequency band (for example, about 6 GHz to about 60 GHz) used for, for example, 5G network communication due to the transmission line. Accordingly, the electronic device 101 may improve a quality or speed of communication with the second cellular network 294 (for example, a 5G network). According to an embodiment, the included third RFFE 236 may be separated from the third RFIC 226 and configured as a separate chip. For example, the third antenna module 246 may include the third RFFE 236 and the antennas 248 on the second substrate. For example, the third RFIC 226 from which the third RFFE 236 is separated in the third antenna module 246 may or may not be disposed on the second substrate.

According to an embodiment, the antennas 248 may be configured as an antenna array including a plurality of antenna elements which can be used for beamforming. In this case, the third RFIC 226 may include, for example, a plurality of phase shifters 238 corresponding to the plurality of antenna elements as a part of the third RFFE, 236. In transmission, the plurality of phase shifters 238 may convert a phase of the 5G Above6 RF signal to be transmitted to the outside of the electronic device 101 (for example, a base station of the 5G network) through a corresponding antenna element. In reception, the plurality of phase shifters 238 may convert the phase of the 5G Above6 RF signal received from the outside through the corresponding antenna element into the same phase or substantially the same phase. This enables transmission or reception through beamforming between the electronic device 101 and the outside.

According to an embodiment, the third antenna module 246 may up-convert the transmission signal of the baseband provided by the second communication processor 214. The third antenna module 246 may transmit the RF transmission signal generated by up-conversion through at least two transmission and reception antenna elements among the plurality of antenna elements. The third antenna module 246 may receive the RF reception signal through at least two transmission and reception antenna elements and at least two reception antenna elements among the plurality of antenna elements. The third antenna module 246 may down-convert the RF reception signal and generate the reception signal of the baseband. The third antenna module 246 may output the reception signal of the baseband generated by down-conversion to the second communication processor 214. The third antenna module 246 may include at least two transmission and reception circuits corresponding to at least two transmission and reception antenna elements in one-to-one correspondence and at least two reception circuits corresponding to at least two reception antenna elements in one-to-one correspondence.

The second cellular network 294 (for example, 5G network) may operate independently from the first cellular network 292 (for example, legacy network) (for example, stand-alone (SA)) or operate through a connection thereto (for example, non-standalone (NSA)). For example, in the 5G network, only an access network (for example, a 5G radio access network (RAN) or a next generation RAN (NG RAN)) may exist without a core network (for example, a next generation core (NGC)). In this case, the electronic device 101 may access the access network of the 5G network and then access an external network (for example, Internet) under the control of the core network (for example, evolved packed core (EPC) of the legacy network. Protocol information (for example, LTE protocol information) for communication with the legacy network and protocol information (for example, new radio (NR) protocol information) for communication with the 5G network may be stored in the memory 230 and may be accessed by another element (for example, the processor 120, the first CP 212, or the second CP 214).

According to various embodiments, the processor 120 of the electronic device 101 may execute one or more instructions stored in the memory 130. The processor 120 may include at least one of a circuit for processing data, for example, an integrated circuit (IC), an arithmetic logic unit (ALU), a field programmable gate array (FPGA), and a large scale integration (LSI). The memory 130 may store data related to the electronic device 101. The memory 130 may include a volatile memory such as a random access memory (RAM) including a static random access memory (SRAM) or a dynamic RAM (DRAM) or a nonvolatile memory such as a read only memory (ROM), a magneto-resistive RAM (MRAM), a spin-transfer torque (STT)-MRAM, a phase-change RAM (PRAM), a resistive RAM (RRAM), a ferro-electric RAM (FeRAM), a flash memory, an embedded multimedia card (eMMC), and a solid state drive (SSD).

According to various embodiments, the memory 130 may store instructions related to applications and instructions related to an operating system (OS). The operating system is system software executed by the processor 120. The processor 120 may manage hardware components included in the electronic device 101 by executing the operating system. The operating system is an application that is the remaining software except for the system software and may provide an application programming interface (API).

According to various embodiments, one or more applications which are a set of a plurality of instructions may be installed in the memory 130. The installation of the application in the memory 130 may indicate that the application is stored in a format which can be executed by the processor 120 connected to the memory 130.

Figure 3:
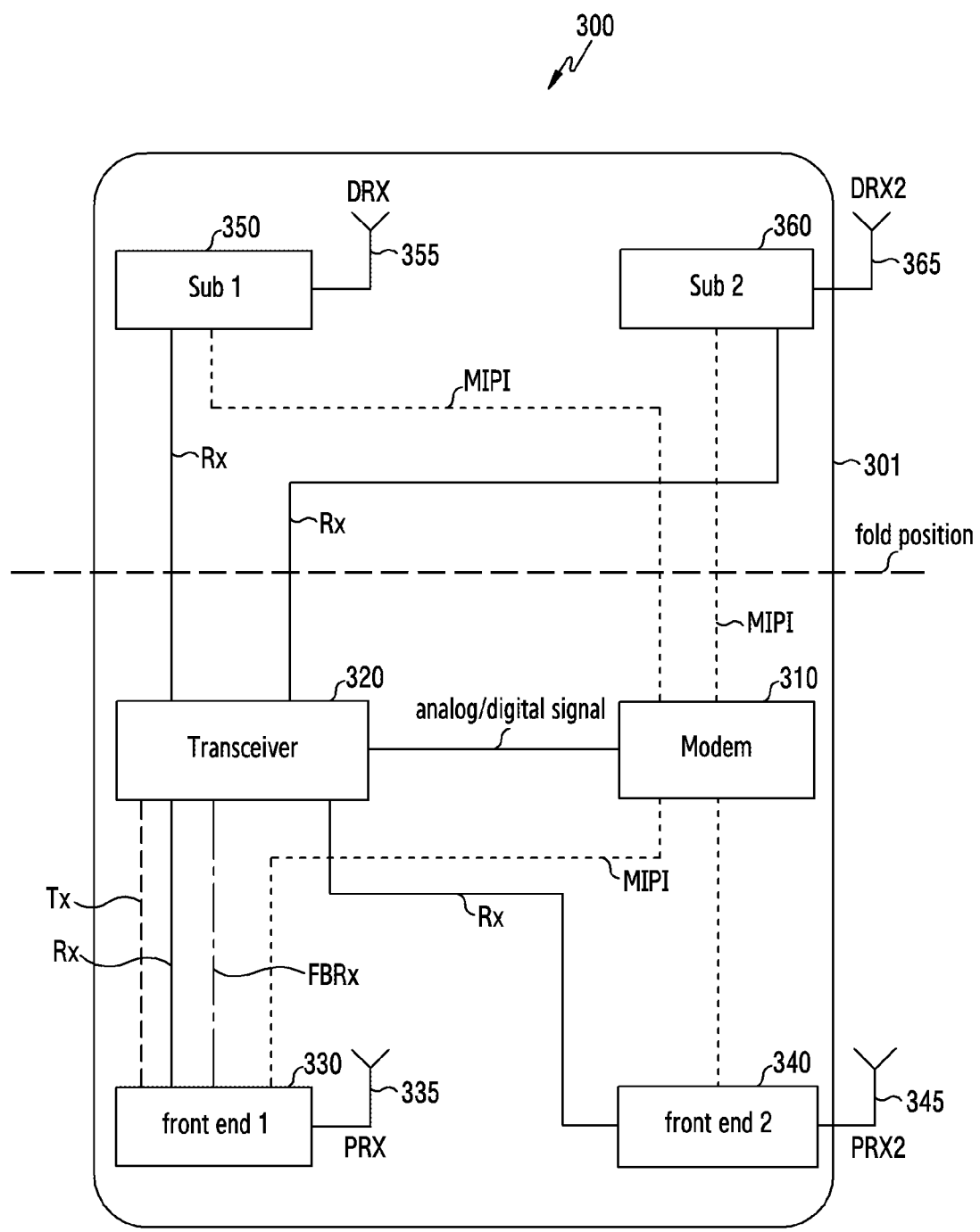
FIG. 3 illustrates the electronic device according to various example embodiments.

FIG. 3 illustrates an electronic device 300 according to various embodiments.

Referring to FIG. 3, the electronic device 300 according to various embodiments may include a modem 310, a transceiver 320, a first front end 330, a second front end 340, a third front end 350, a fourth front end 360, a first antenna module (or, first antenna circuit) 335, a second antenna module (or, second antenna circuit) 345, a third antenna module (or, third antenna circuit) 355, and a fourth antenna module (or, fourth antenna circuit) 365. The first antenna module (or, first antenna circuit) 335, the second antenna module (or, second antenna circuit) 345, the third antenna module (or, third antenna circuit) 355, and the fourth antenna module (or, fourth antenna circuit) 365 may be disposed in at least a portion, the outside, or the inside of a case (or housing) of the electronic device 300, and it may be easily understood by those skilled in the art that the disposition is not limited to the examples illustrated in FIG. 3. For example, the first antenna module 335, the second antenna module 345, the third antenna module 355, and the fourth antenna module 365 may be included in the case 301 or in at least a portion of the case 301.

As an embodiment, the modem 310 may perform transmission and processing of a signal related to a transmission/reception operation of the electronic device 300. As an embodiment, the modem 310 may modulate a signal to be transmitted through the first to fourth antenna modules 335, 345, 355, and 365. The modem 310 may process decoding of the signal received through the first to fourth antenna modules 335, 345, 355, and 365.

As an embodiment, the transceiver 320 may convert a transmission baseband signal into an RF signal or convert a reception RF signal into a baseband signal. The transceiver 320 may select a path based on a communication scheme and transfer the transmission RF (Tx) signal to the first front end 330. The transceiver 320 may include at least one reception (Rx) chain through which the reception RF signal is received through the first to fourth antenna modules 335, 345, 355, and 365 and the front end (for example, the first front end 330). According to various embodiments, the transceiver 320 may convert a baseband signal into an RF signal in various bands. The transceiver 320 may convert a baseband signal into a radio frequency (RF) signal based on the 5G in a band equal to or lower than a 6 GHz band or into an RF signal based on the 2G, 3G, and 4G. The transceiver 320 may convert a baseband signal into an RF signal based on the 5G in a band higher than or equal to a 6 GHz band or into an RF signal in a super-high frequency band. The transceiver 320 may receive feedback of a portion of the Tx signal output from the first front end 330 in a feedback Rx (FBRx) scheme and identify a strength value of the Tx signal (for example, a power value). The transceiver 320 may transfer the strength value of the Tx signal to the processor (for example, the processor 120 of FIG. 1). As the Tx signal having a predetermined value leaks from (or flows into) a Tx path to an Rx path according to the strength of the Tx signal (or a transmission signal or a Tx output signal), the processor 120 may estimate the strength of the Tx signal flowing into an Rx chain on the basis of the strength of the Tx signal.

As an embodiment, the first front end 330 is a primary (or main) front end and may include a transmission circuit and a reception circuit. The first front end 330 may be at least one of an LNA power amplifier module in duplexer (LP-AMID) front end including a duplexer, a plurality of low noise amplifiers (LNAs), a plurality of Rx filters, a plurality of power amplifiers, and a plurality of switches. As an embodiment, the second front end 340 is a primary front end and may include a reception circuit. The second front end 340 may operate as a diversity front end as a portion of 4Rx. The second front end 340 may be at least one of an LNA front end module (LFEM) front end including a plurality of low noise amplifiers (LNAs), a plurality of Rx filters, and a plurality of switches. As an embodiment, the third front end 350 is a diversity front end and may include a reception circuit. The third front end 350 may be at least one of an LFEM front end including a plurality of low noise amplifiers (LNAs), a plurality of Rx filters, and a plurality of switches. As an embodiment, the fourth front end 360 is a diversity front end and may include a reception circuit. The fourth front end 360 may be at least one of an LFEM front end including a plurality of low noise amplifiers (LNAs), a plurality of Rx filters, and a plurality of switches.

As an embodiment, the first front end 330 and the first antenna module 335 may be electrically connected. The second front end 340 and the second antenna module 345 may be electrically connected. The third front end 350 and the third antenna module 355 may be electrically connected. The fourth front end 360 and the fourth antenna module 365 may be electrically connected.

As an embodiment, the electronic device 300 may include a plurality of primary reception (Rx) (PRX) paths and a plurality of diversity reception (DRX) paths. A PRX1 path may be used to transmit and receive, for example, a 5G-based radio frequency (RF) signal equal to or lower than a 6 GHz band, a 2G, 3G, and 4G-based RF signal, or a 5G-based RF signal higher than or equal to a 6 GHz band through the first antenna module 335. A PRX2 path may be used to transmit and receive, for example, a 5G-based radio frequency (RF) signal equal to or lower than a 6 GHz band, a 2G, 3G, and 4G-based RF signal, or a 5G-based RF signal higher than or equal to a 6 GHz band through the second antenna module 345. A DRX1 path may be used to transmit and receive, for example, a 5G-based radio frequency (RF) signal equal to or lower than a 6 GHz band, a 2G, 3G, and 4G-based RF signal, or a 5G-based RF signal higher than or equal to a 6 GHz band through the third antenna module 355. A DRX2 path may be used to transmit and receive, for example, a 5G-based radio frequency (RF) signal equal to or lower than a 6 GHz band, a 2G, 3G, and 4G-based RF signal, or a 5G-based RF signal higher than or equal to a 6 GHz band through the fourth antenna module 365.

As an embodiment, the first antenna module 335, the second antenna module 345, the third antenna module 355, and the fourth antenna module 365 may include at least one of the antenna module 197 of FIG. 1 and the first antenna module 242 and the second antenna module 244 of FIG. 2. The first antenna module 335, the second antenna module 345, the third antenna module 355, and the fourth antenna module 365 may transmit a signal or power to the outside (for example, an external electronic device) or receive the same from the outside. According to an embodiment, the first antenna module 335, the second antenna module 345, the third antenna module 355, and the fourth antenna module 365 may be configured on a substrate (for example, PCB).

As an embodiment, the electronic device 300 may be a non-foldable device.

As an embodiment, the electronic device 300 may be a foldable device. When the electronic device 300 is a foldable device, the case 301 may include a foldable structure (not shown) (for example, hinge). The case 301 may include a fold position folded by the foldable structure. For example, when the case 301 of the electronic device 300 is folded, one part of the case 301 and the remaining parts thereof may face and approach each other on the basis of the fold position.

Figure 4A:
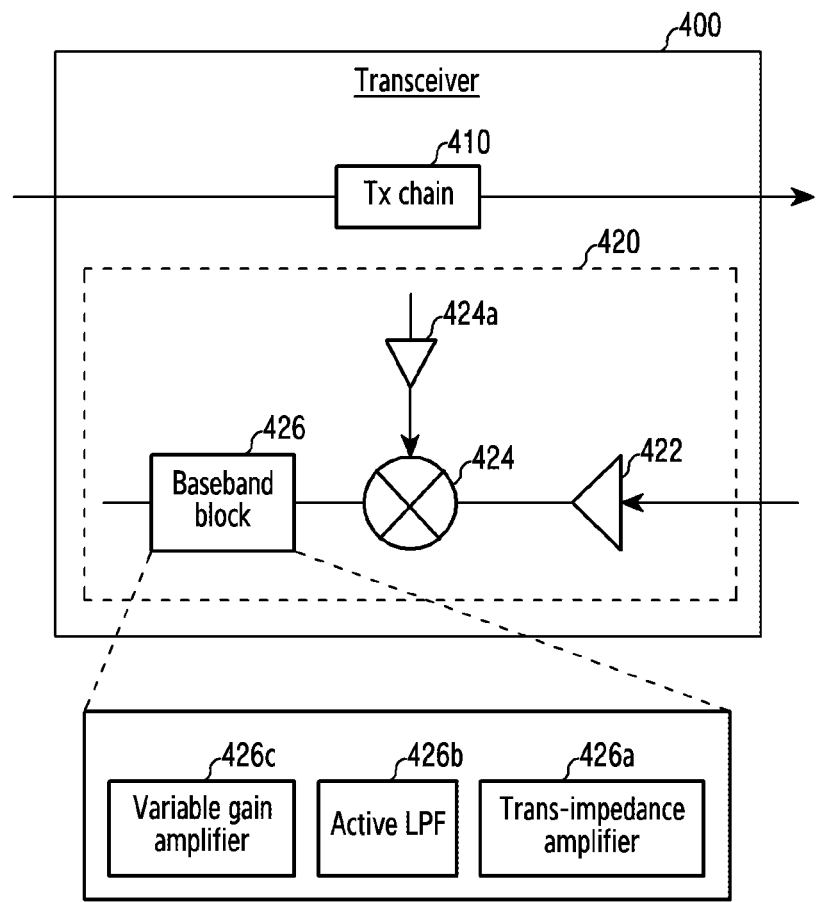
FIG. 4A illustrates a transceiver of the electronic device according to various example embodiments.
Figure 4B:
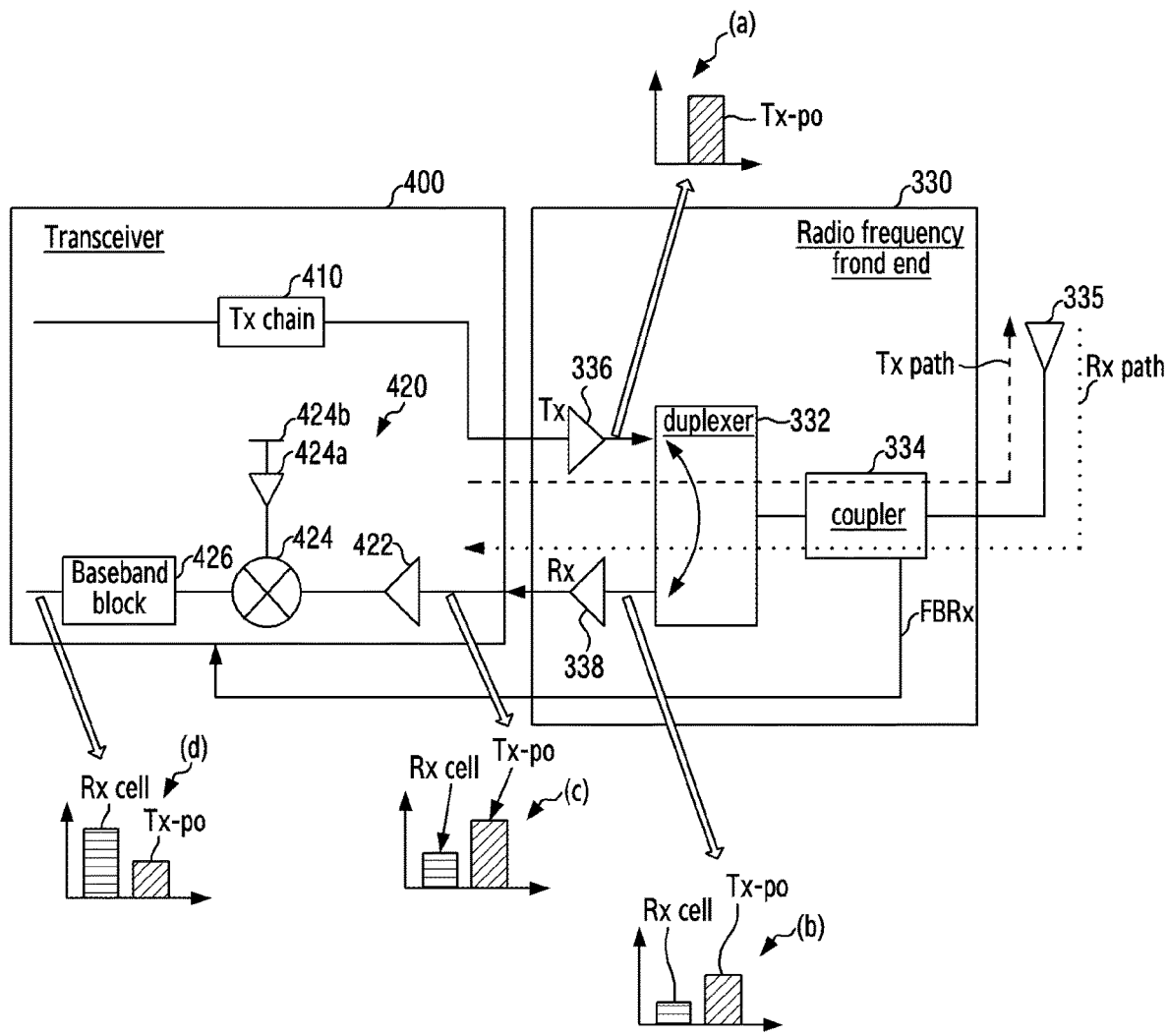
FIG. 4B illustrates the flow of output signals of a Tx path into an Rx path in the electronic device according to various example embodiments.

FIG. 4A illustrates a transceiver 400 of the electronic device 300 according to various embodiments. FIG. 4B illustrates flowing of an output signal of the Tx chain of the electronic device 300 into the Rx chain according to various embodiments.

Referring to FIGS. 4A and 4B, as an embodiment, the transceiver 400 (for example, the transceiver 320 of FIG. 3) may be electrically connected, directly or indirectly, to at least one RF front end (for example, the first front end 330, the second front end 340, the third front end 350, and/or the fourth front end 360). FIG. 4B illustrates an example in which the transceiver 400, the first front end 330, and the antenna module (or, antenna circuit) 335 are electrically connected, directly or indirectly.

In various embodiments, the "Tx path" may refer to, for example, at least a portion of all paths through which the transmission signal moves in the Tx chain 410 included in the transceiver 400, the front end 330, and the antenna module 335. In various embodiments, the "Rx path" may refer to at least a portion of all paths through which the reception signal moves in the antenna module 335, the front end 330, and the Rx chain 420 included in the transceiver 400.

As an embodiment, the first front end 330 may include a duplexer 332, a coupler 334, a transmission signal amplifier 336, and a reception signal amplifier 338. The duplexer 332 may separate transmission and reception frequencies and transfer the Tx signal received from the transceiver 400 to the antenna module 335. The duplexer 332 may transfer the Rx signal from the antenna module 335 to the transceiver 400. The coupler 334 may separate a part of the Tx signal without any interference and transfer the same to the transceiver 400. The transmission signal amplifier 336 may amplify the transmission signal transmitted from the TX chain 410 of the transceiver 400. In an embodiment, the transmission signal amplifier 336 may include a power amplifier but there is no limitation therein. The reception signal amplifier 338 may amplify the reception signal transmitted from the antenna module 335 and transfer the same to the transceiver 400. In an example embodiment, the reception signal amplifier 338 may include an LNA but there is no limited therein.

As an embodiment, the transceiver 400 may include at least one Tx chain 410 and at least one Rx chain 420. The Tx chain 410 may include a power amplifier (not shown), and may convert a transmission baseband signal into a 5G-based signal equal to or lower than a 6 GHz band, a 2G, 3G, and 4G-based RF signal, or a 5G-based RF signal higher than or equal to a 6 GHz band and output the RF signal.

As an embodiment, the Rx chain 420 may include a low noise amplifier (LNA) 422, a mixer 424, a local oscillator (LO) 424a of the mixer 424, and a baseband block 426. The baseband block 426 may include a trans-impedance amplifier 426a, an active low pass filter (LPF) 426b, and a variable gain amplifier 426c.

As an embodiment, the LNA 422 may reduce noise in the received RF signal, and amplify and output the signal. The mixer 424 may down-covert a high-frequency signal of the RF to a baseband signal and output the down-converted RF signal. The mixer 424 may use a CMOS I/Q mixer in a differential structure. When the CMOS I/Q mixer in the differential structure is applied, a current signal rather than a voltage signal may be output as the output signal. In this case, in order to convert the current output signal into the voltage signal, a trans-impedance amplifier may be used in the baseband block 426.

As an embodiment, the signal dropped to the baseband may pass through the active LPF 426b. The active LPF 426b may reduce a Tx leakage signal that leaks from the Tx path.

According to an embodiment, the Tx output signal of the Tx path may leak to the Rx path. An output signal at a predetermined ratio may leak to the Rx chain 420 from the Tx path according to the Tx output signal. A power value of the Tx signal leaking to the Rx chain 420 may have a value smaller than a power value of the original Tx signal. When the Rx signal is amplified in the Rx chain 420, the leaked Tx signal may also be amplified. The processor (for example, the processor 120 of FIG. 1, the first communication processor 212 of FIG. 2, or the second communication processor 214 of FIG. 2) may estimate the strength of the Tx signal flowing into the Rx chain through the strength of the Tx output signal. Each processor herein comprises processing circuitry.

According to an embodiment, the electronic device 300 may change power of at least some of the LNA 422, the mixer 424, and/or the active LPF 426b of the Rx chain 420 and change driving of the circuit on the basis of the strength of the Tx output signal (Tx power) (hereinafter, referred to as "Tx-po"). The change in power (for example, voltage) of the LNA 422, the mixer 424, and/or the active LPF 426b of the Rx chain 420 and/or the change in driving of the circuit may be made by the processor (for example, the processor 120 of FIG. 1, the first communication processor 212 of FIG. 2, or the second communication processor 214 of FIG. 2). Through the change in power (for example, voltage) of the LNA 422, the mixer 424, and/or the active LPF 426b of the Rx chain 420 and/or the change in driving of the circuit, it is possible to reduce the current consumed by the Rx chain 420 by a link with the strength of the Tx output signal of the Tx chain 410 of the electronic device 300.

As an embodiment, the electronic device 300 may control a voltage drain (VDD) voltage value of the LNA 422 of the Rx chain 420 on the basis of the strength of the Tx output signal of the Tx chain 410. A an embodiment, a voltage value of the local oscillator (LO) 424a of the mixer 424 of the Rx chain 420 may be controlled on the basis of the strength of the Tx output signal of the Tx chain 410.

As an embodiment, the electronic device 300 may control on and off of a plurality of LPFs included in the active LPF 426b of the Rx chain 420 on the basis of the strength of the Tx output signal of the Tx chain 410. As an embodiment, the electronic device 300 may perform at least one of the operations of controlling the VDD voltage value of the LNA 422 of the Rx chain 420, controlling the LO voltage value of the mixer 424 of the Rx chain, and controlling on and off of the plurality of LPFs included in the active LPF 426b on the basis of the strength of the output signal of the Tx chain 410.

As an embodiment, referring to a series of operations based on a graph (a) to a graph (d) illustrated in FIG. 4B, the graph (a) indicates the strength of a transmission signal (Tx_po), which is output from the Tx chain 410 of the transceiver 400 and amplified and output through the transmission signal amplifier 336 of the first front end 330. In an example, when the transmission signal output through the transmission signal amplifier 336 passes through the duplexer 332, some of the transmission signal may flow into the Rx path. In an example, as the strength of the transmission signal (Tx_po) is larger, the strength of the signal flowing into the Rx chain 420 may be larger. The graph (b) indicates the strength of the signal (Tx_po) (hereinafter, referred to as an inflow signal) flowing into the Rx path from the transmission signal and the reception signal (Rx_cell) transmitted to the transceiver 400 through the antenna module 335 and the duplexer 332. The reception signal and the inflow signal output through the duplexer 332 may be amplified while passing through the reception signal amplifier 338. The graph (c) indicates the strength of the reception signal and the inflow signal amplified through the reception signal amplifier 338 and transmitted to the transceiver 400. It may be noted that the reception signal and the inflow signal of the graph (c) have the signal strength larger than that of the graph (b) through the amplifier. The graph (d) indicates the strength of the signal after the transmission signal and the inflow signal transmitted to the transceiver 400 passes through the LNA 422, the mixer 424, and the baseband block 426. The inflow signal may have the signal strength which becomes smaller through the LNA 422, the mixer 424, and the baseband block 426. The electronic device 300 may decrease the strength of the inflow signal so as to reduce the current consumed by the Rx chain 420 by controlling a configuration (for example, the voltage value of the LO 424a of the mixer 424) of at least one element included in the Rx chain 420 of the transceiver 400 on the basis of the strength of the transmission signal (Tx-po).

Figure 5A:
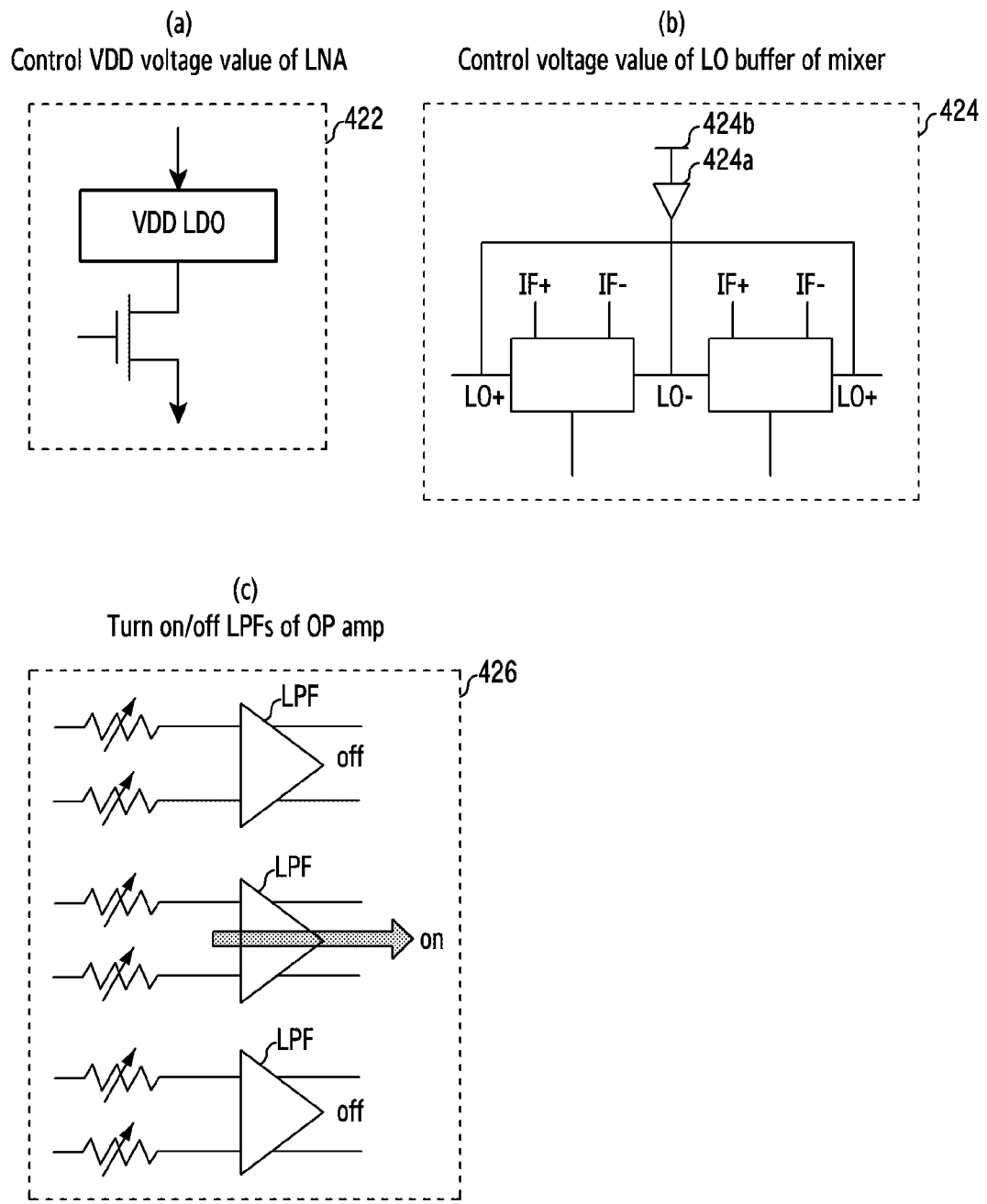
FIG. 5A illustrates an example of changing the configuration of the Rx chain.

FIG. 5A illustrates an example of changing the configuration of the Rx chain.

Referring to FIG. 2 and FIGS. 4A to 5A, the processor (for example, the processor 120 of FIG. 1, the first communication processor 212 of FIG. 2, or the second communication processor 214 of FIG. 2) may configure a reference value (for example, reference point) of the strength of the Tx output signal for changing power of at least one of the elements included in the Rx chain 420 and changing driving of the circuit.

TABLE 1

| Tx power (Tx-po) | LNA(522) | Mixer(524) | Active LPF(526b) |
|---|---|---|---|
| (Tx-po) < (first reference value) | Decrease VDD voltage value | Decrease LO buffer voltage value | Turn off some of LPF |
| (Tx-po) > (first reference value) | Increase VDD voltage value/Maintain initial value | Increase LO buffer voltage value/Maintain initial value | Turn on some of LPF |

Referring to FIG. 4B, FIG. 5A(a), and Table 1, as an embodiment, when the strength of the Tx signal (Tx-po) of the Ex chain 410 is smaller than a first reference value, power of the Tx signal (for example, inflow signal) flowing into the Rx chain 420 may also be small. For example, the processor 120 may configure the first reference value as 20 dBm and identify whether the strength of the Tx signal (Tx-po) of the Tx chain 410 is smaller than 20 dBm. When the strength of the Tx signal (Tx-po) is smaller than the first reference value, the processor 120 may lower the voltage drain (VDD) voltage value. As described above, it is possible to improve the current consumed by the Rx chain 420 by changing low-dropout (LDO) power of the LNA 422.

As an embodiment, when the strength of the Tx output signal (Tx-po) is larger than the first reference value, the strength of the Tx output signal (for example, inflow signal) flowing into the Rx chain 420 may become large. When the strength of the Tx output signal (Tx-po) is larger than the first reference value, the processor 120 may increase the VDD voltage value. However, it is not limited thereto, and the processor 120 may not change the VDD voltage value of the LNA 422 and maintain the initially configured value when the strength of the Tx output signal (Tx-po) is larger than the first reference value.

Referring to FIG. 4B, FIG. 5A(b), and Table 1, when the strength of the Tx signal (Tx-po) of the Ex chain 410 is smaller than the first reference value, power of the Tx output signal (for example, inflow signal) flowing into the Rx chain 420 may also be small. When the strength of the Tx output signal (Tx-po) is smaller than the first reference value, the processor 120 may lower the voltage value 424b of the local oscillator (LO) 424a of the mixer 424. As described above, it is possible to improve the current consumed by the Rx chain 420 through a change of the driven strength of the LO 424a (for example, a change in a voltage value or a buffer bias).

As an embodiment, when the strength of the Tx output signal (Tx-po) is larger than the first reference value, the strength of the Tx output signal (for example, inflow signal) flowing into the Rx chain may become large. When the strength of the Tx output signal is larger than the first reference value, the processor 120 may increase the voltage value (for example, buffer bias) of the LO 424a of the mixer 424. However, it is not limited thereto, and the processor 120 may not change the voltage value of the LO 424a of the mixer 424 and maintain the initially configured value when the strength of the Tx output signal (Tx-po) is larger than the first reference value.

Referring to FIG. 4B, FIG. 5A(c), and Table 1, as an embodiment, when the strength of the Tx output signal (Tx-po) of the Tx chain 410 is smaller than the first reference value, the strength of the Tx signal (for example, inflow signal) flowing into the Rx chain may become small. When the strength of the Tx output signal (Tx-po) is smaller than the first reference value, the processor 120 may turn off at least some of the active LPF 426b for attenuating Tx leakage among the plurality of active LPFs 426b included in the baseband block 426. As described above, it is possible to improve the current consumed by the Rx chain 420 by turning off some active LPFs 426b (for example, LPF attenuating Tx leakage) among the plurality of active LPFs 426b.

As an embodiment, when the strength of the Tx output signal (Tx-po) is larger than the first reference value, the strength of the Tx output signal flowing into the Rx chain 420 may become large. When the strength of the Tx output signal (Tx-po) is larger than the first reference value, the processor 120 may turn on all active LPFs 426b included in the baseband block 426.

Figure 5B:
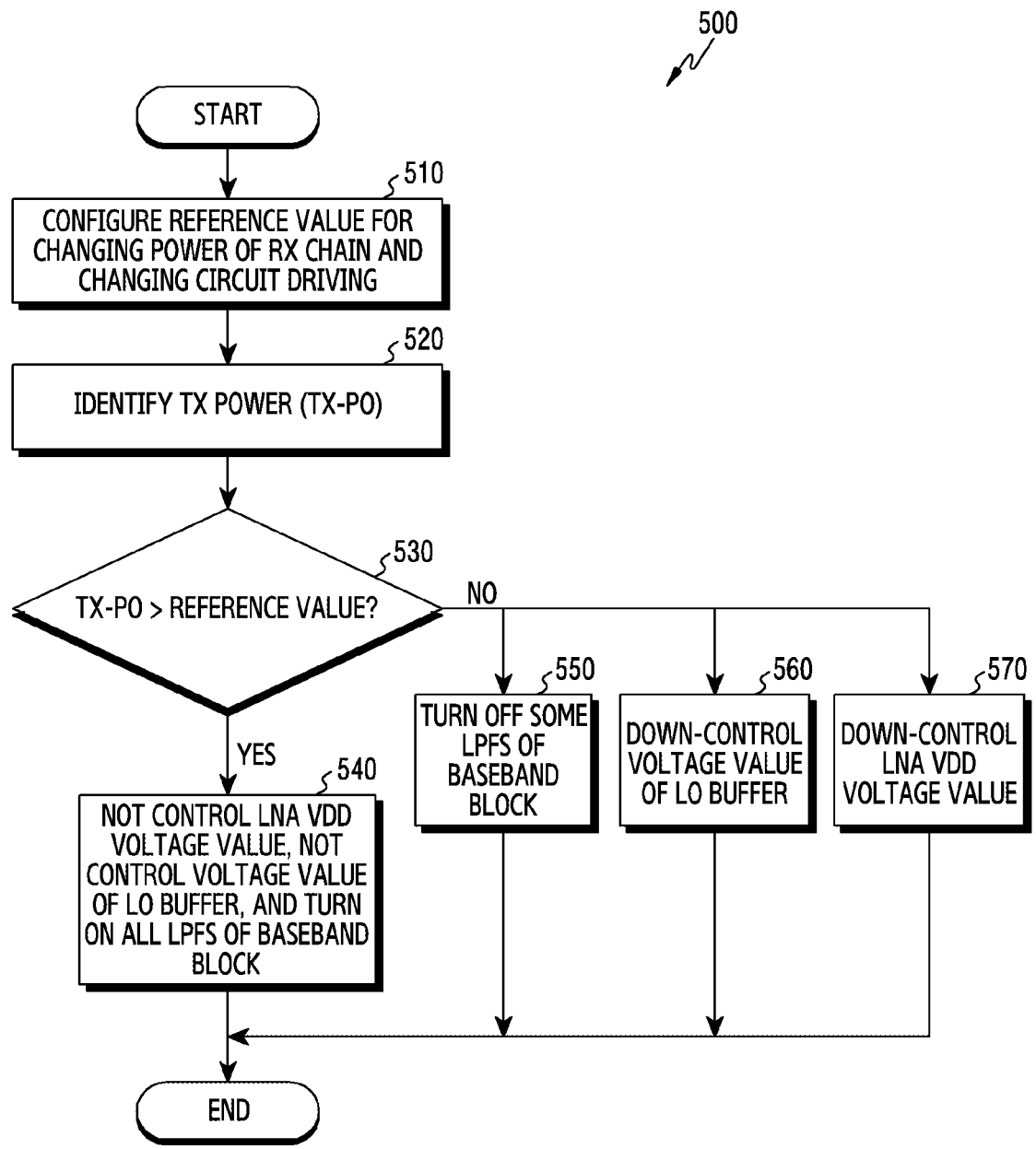
FIG. 5B illustrates an example of a method of changing configurations of Rx chains on the basis of the strength of Tx output signals.

FIG. 5B is a diagram 500 illustrating an example of a method of changing a configuration of the Rx chain on the basis of the strength of the Tx output signal. A gain characteristic of the RX chain may be maintained without any change. Compensation for reference signal received power (RSRP) may not be performed.

Referring to FIG. 4B and FIG. 5B, as an embodiment, the processor (for example, the processor 120 of FIG. 1, or the first communication processor 212 or the second communication processor 214 of FIG. 2) may configure a reference value (for example, the first reference value) for changing power of at least one of the elements included in the Rx chain 420 and changing driving of the circuit in operation 510.

As an embodiment, in operation 520, the processor 120 may identify the strength (Tx-po) of the Tx output signal output through the front end (for example, the first front end 330 of FIG. 3).

As an embodiment, in operation 530, the processor 120 may determine whether the strength of the Tx output signal (Tx-po) is larger than the reference value.

As an embodiment, when the strength of the Tx output signal (Tx-po) is larger than the reference value, the processor 120 may turn on all LPFs of the baseband block without controlling the VDD voltage value of the LNA and the voltage value of the LO buffer in operation 540. However, it is not limited thereto and, when the strength of the Tx output signal (Tx-po) is larger than the reference value, the processor 120 may increase the VDD voltage value of the LNA and the voltage value of the LO buffer and turn on all LPFs of the baseband block.

As an embodiment, when the strength of the Tx output signal (Tx-po) is not larger than the reference value, the processor 120 may turn off some LPFs of the baseband block in operation 550.

As an embodiment, when the strength of the Tx output signal (Tx-po) is not larger than the reference value, the processor 120 may lower the voltage value of the LO buffer in operation 560.

As an embodiment, when the strength of the Tx output signal (Tx-po) is not larger than the reference value, the processor 120 may lower the VDD voltage value of the LNA in operation 570.

The processor 120 may perform only one of operations 550, 560, and 570. The processor 120 may perform two of operations 550, 560, and 570. The processor 120 may perform all of operations 550, 560, and 570.

Figure 6:
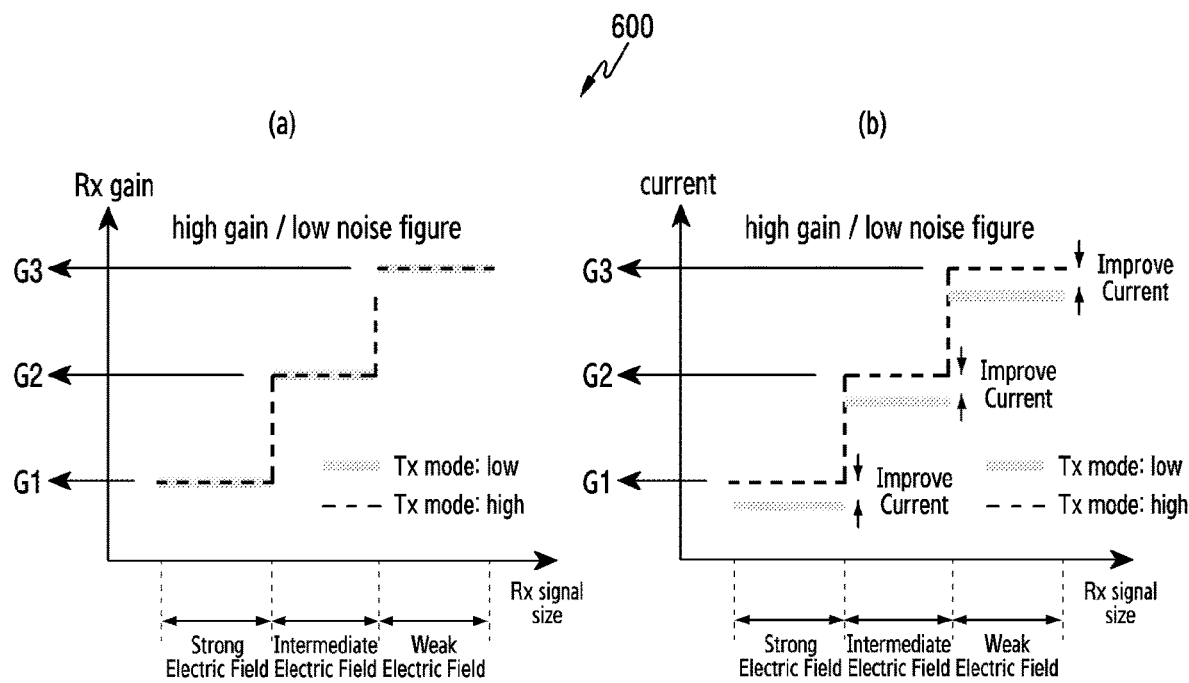
FIG. 6 illustrates the current for each Rx chain when some active LPFs are turned off, in an example embodiment.

FIG. 6 illustrates the current for each Rx chain when some active LPFs are turned off.

Referring to FIGS. 2 and 6, FIG. 6A illustrates an Rx chain current value for the strength of the Rx signal when the strength of the Tx signal is high (Tx mode-high) and low (Tx mode-low) according to a comparative example. FIG. 6B illustrates an Rx chain current value for the strength of the Rx signal when the strength of the Tx signal is high (Tx mode-high) and the strength of the Tx signal is low (Tx mode-low) according to an embodiment. The processor 120 (for example, the processor 120 of FIG. 1 or the first communication processor 212 or the second communication processor 214 of FIG. 2) may classify the reception signal into a strong electric field, an intermediate electric field, and a weak electric field according to the strength of the reception signal. It is possible to maintain a dynamic range of all Rx cells by changing a gain mode configuration of the internal Rx LNA 422 according to the strength of the reception signal (strong electric field, intermediate electric field, and weak electric field). The processor 120 may control a gain mode within the RFIC and the current for each Rx chain according to the strength of the reception signal (strong electric field, intermediate electric field, and weak electric field).

According to an embodiment, when the strength of the Tx output signal of the Tx chain is smaller than the first reference value (Tx mode-low), the processor 120 of FIG. 2 may turn off some active LPFs. Even when some active LPFs are turned off, the Rx current may be improved as illustrated in FIG. 6B.

Figure 7:
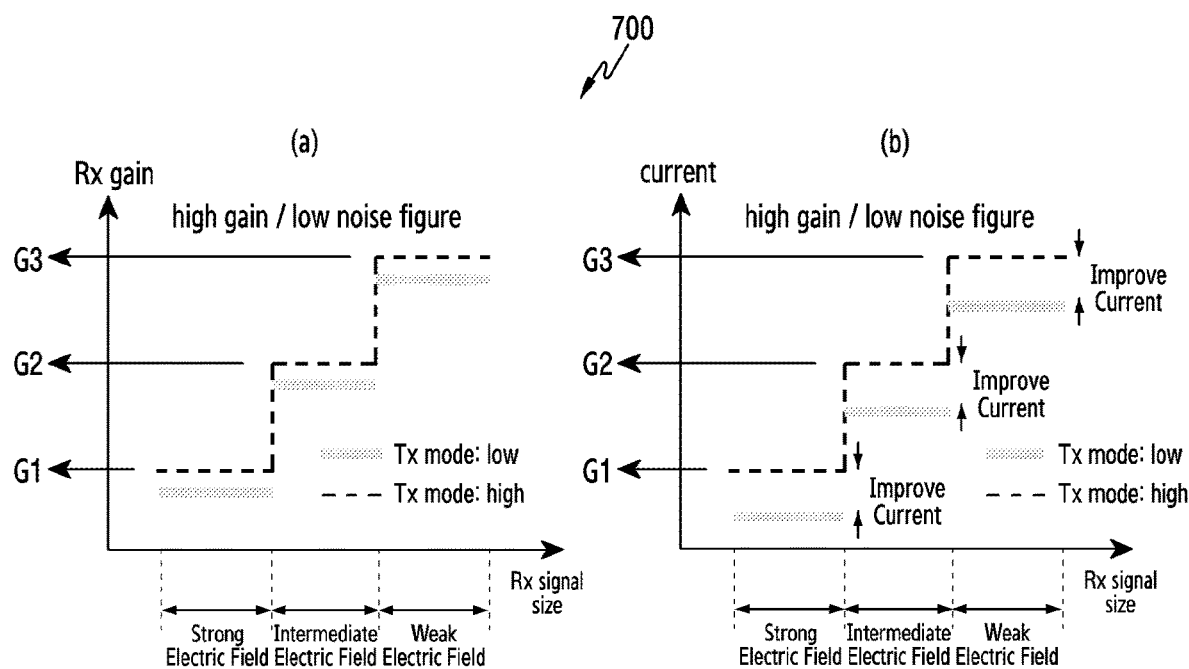
FIG. 7 illustrates the Rx gain and the current for each Rx chain when the voltage of the buffer of the mixer or the VDD voltage value of the LNA is lowered, in an example embodiment.

FIG. 7 illustrates the Rx gain and the current for each Rx chain when the voltage of the buffer of the mixer or the VDD voltage value of the LNA is lowered.

Referring to FIG. 7, FIG. 7A illustrates an Rx chain current value for the strength of the Rx signal when the strength of the Tx signal is high (Tx mode-high) and low (Tx mode-low) according to a comparative example. FIG. 7B illustrates an Rx chain current value for the strength of the Rx signal when the strength of the Tx signal (Tx mode-high) and the strength of the Tx signal is low (Tx mode-low) according to an embodiment. The processor 120 may control the voltage value of the LO 424 (for example, the voltage value of the LO buffer) within the mixer 424 and the LDO voltage value of the LNA 422 according to the strength of the reception signal (strong electric field, intermediate electric field, and weak electric field). When the strength of the Tx output signal of the Tx chain is smaller than the first reference value, the processor 120 may lower the voltage (for example, buffer bias) value of the LO 424 within the mixer 424 and lower the LDO voltage of the LNA 422. When the voltage of the LO 424 within the mixer 424 is lowered and the LDO voltage of the LNA 422 is lowered, the reception performance may be maintained while the Rx gain is reduced by 1 to 2 dB and the Rx current is reduced. However, it is not limited thereto, and the Rx current may be reduced and the reception performance may be maintained by lowering the voltage value of the LO 424 within the mixer 424 and lowering the LDO voltage of the LNA 422 without any influence on the strength of the reception signal (strong electric field, intermediate electric field, and weak electric field).

As an embodiment, in order to maintain the reception performance of the electronic device 300, it is possible to control the internal voltage of the RFIC that is not enough to reduce a gain. Alternatively, it is possible to subdivide the change in power of at least one of the elements included in the Rx chain or circuit driving by subdividing the strength of the Tx output signal. Values for changing power of at least one of the elements included in the Rx chain according to the strength of various Tx output signals and changing circuit driving may be recorded in a lookup table, and the values for changing power of the Tx chain and changing circuit driving may be subdivided and applied. Alternatively, the values for changing power of the Tx chain and changing circuit driving may be applied in real time according to the strength of the Tx output signal that varies in real time.

As an embodiment, when 4×4 or carrier aggregation (CA) is applied, the configuration of the RFIC may be changed according to the strength of the Tx output signal. The configuration of the RFIC may be changed on the basis of the strength of the Tx output signal which is the same as the reference of the change in the PRX since it is difficult to secure antenna isolation within the electronic device 300.

Figure 8A:
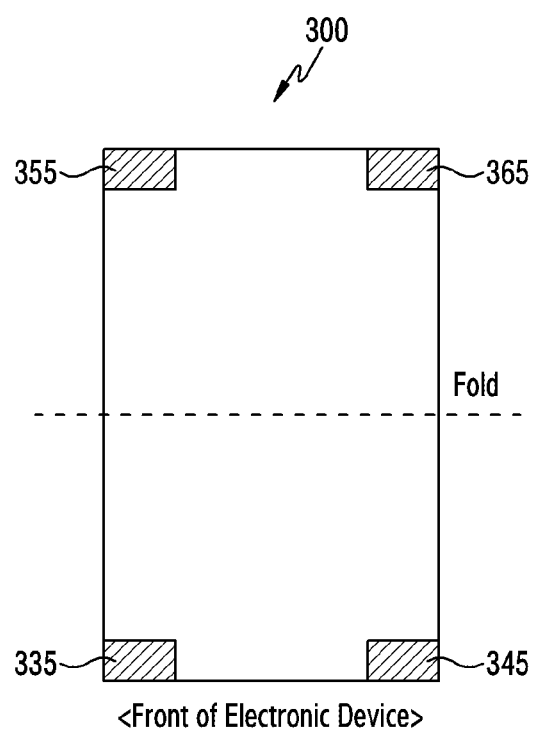
FIG. 8A illustrates an example of antenna modules which become closer to each other when the electronic device is folded, in an example embodiment.
Figure 8A:
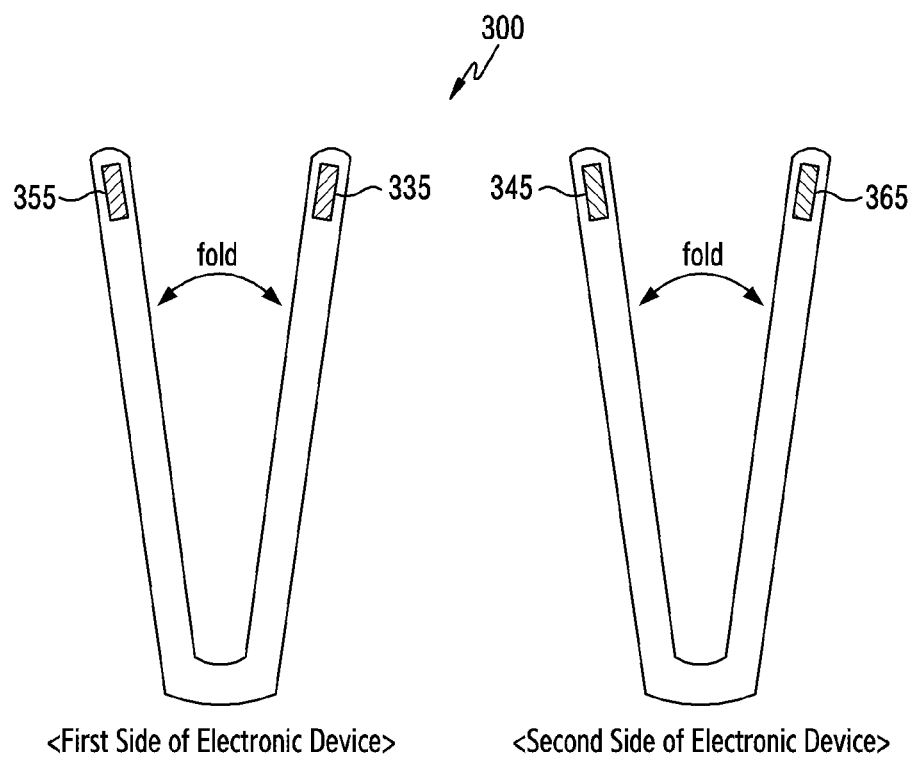
Figure 8B:
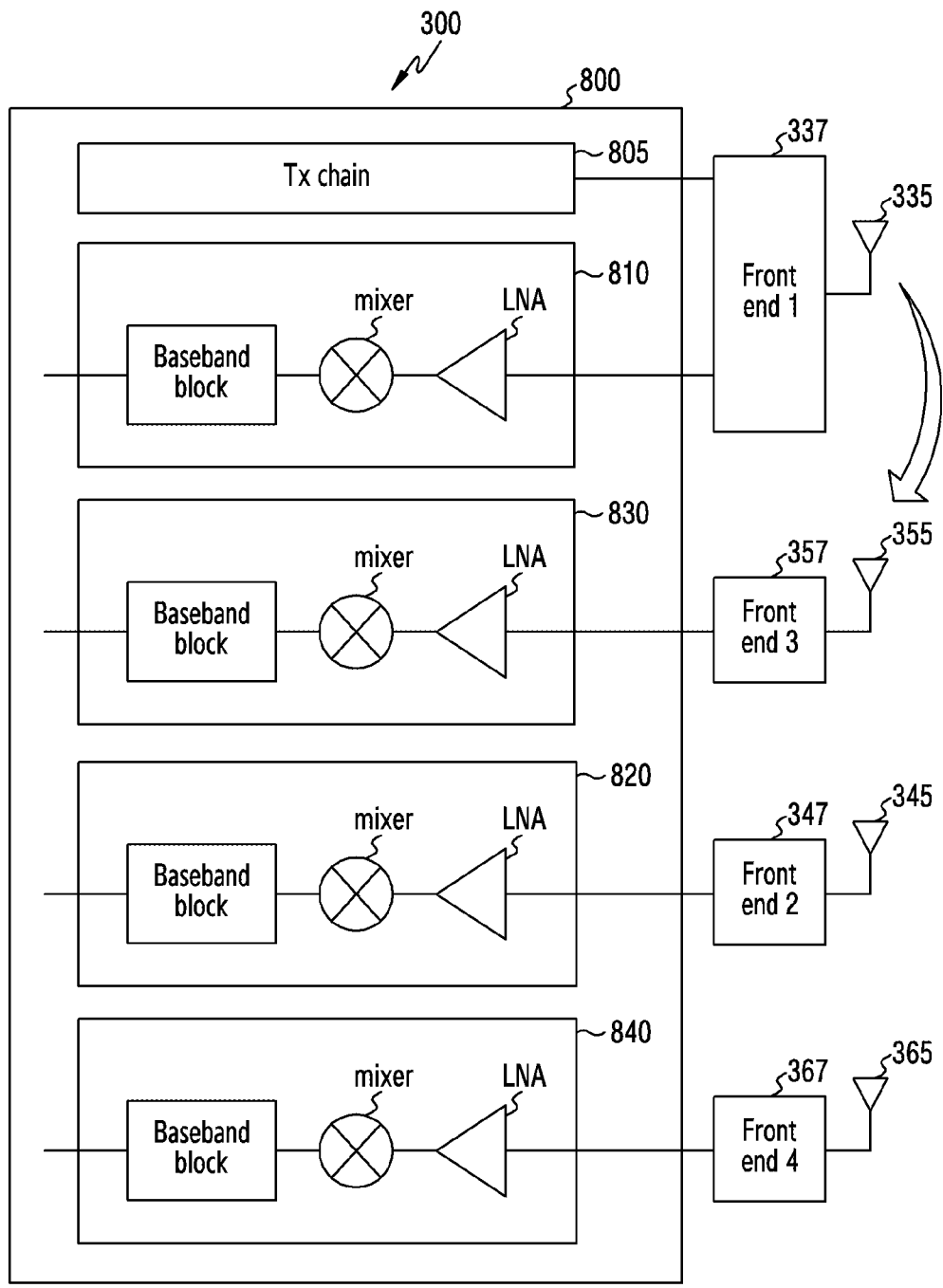
FIG. 8B illustrates a change in configurations of Rx chains in consideration of proximity between antennas when the electronic device is folded, in an example embodiment.

FIG. 8A illustrates an example of antenna modules approaching each other when the electronic device 300 is folded. FIG. 8B illustrates a change in configurations of Rx chains 810, 820, 830, and 840 in consideration of proximity of antenna modules (or, antenna circuits) when the electronic device 300 is folded.

Referring to FIG. 3 and FIGS. 8A and 8B, the electronic device 300 (for example, the electronic device 300 of FIG. 3) according to an embodiment may be a foldable device. The electronic device 300 may include a first antenna module 335, a second antenna module 345, a third antenna module 355, and a fourth antenna module 365. With respect to the first antenna module 335 to the fourth antenna module 365, when the electronic device 300 is viewed at the front thereof (for example, the surface on which the display is exposed), the first antenna module 335 may be located on a lower left side, the second antenna module 345 may be located on a lower right side, the third antenna module 355 may be located on an upper left side, and the fourth antenna module 365 may be located on an upper right side. At least one of the first antenna to the fourth antenna may be included in at least a part of the housing (or case (for example, the case of FIG. 3). For example, at least a part of the case made of conductive metal materials may be used as the antenna modules 335, 345, 355, and 365.

According to an embodiment, when the electronic device 300 is viewed at the front thereof, when the electronic device 300 is folded on the basis of a fold line crossing the electronic device 300 from side to side, the first antenna module 335 and the third antenna module 355 may be in proximity to each other as shown in the example in which the electronic device 300 is viewed at a first aspect on the basis of the front of the electronic device 300. The second antenna module 345 and the fourth antenna module 365 may be in proximity to or meet each other as shown in the example in which the electronic device 300 is viewed at a second aspect on the basis of the front of the electronic device 300. In an embodiment, at least some areas of some antenna modules (for example, the first antenna module 335 and the third antenna module 355) of the electronic device 300 may be in proximity to and meet each other according to a folding structure of the electronic device 300. In an embodiment, at least some areas of some antenna modules (for example, the second antenna module 345 and the fourth antenna module 365) of the electronic device 300 may be in proximity to and meet each other according to a folding structure of the electronic device 300.

According to an embodiment, the electronic device 300 may include a transceiver 800 (for example, the transceiver 400 of FIG. 4B). The transceiver 800 (for example, the transceiver 400 of FIG. 4B) may include the first front end 337 (for example, the front end 330 of FIG. 4B) connected, directly or indirectly, to the first antenna module 335, the second front end 347 connected to the second antenna module 345, the third front end 357 connected to the third antenna module 355, the fourth front end 367 connected to the fourth antenna module 365, a Tx chain 805, a first Rx chain 810, a second Rx chain 820, a third Rx chain 830, and a fourth Rx chain 840. FIG. 8B illustrates antenna modules in proximity to each other when the electronic device 300 of FIG. 8A is folded for convenience of description, and it should be noted that arrangement of actual antenna modules is not illustrated. For example, when the electronic device 300 of FIG. 8A is folded on the basis of a folding line, the first antenna module 335 and the third antenna module 355 may be in proximity to or meet each other, and the second antenna module 345 and the fourth antenna module 365 may be in proximity to and meet each other.

According to an embodiment, when antenna modules are in proximity to or meet each other, some of transmission signals output from the antenna modules may flow more into other adjacent antennas compared to the case in which the antenna modules are not in proximity to each other. For example, some of the transmission signal which is output from the Tx chain 805 of the transceiver 800 to the first antenna module 335 through the first front end 337 may flow more into the Tx path of the third antenna module 335 in the folded state of the electronic device 300 compared to the case in which the electronic device 300 is not folded. The signal flowing through the third antenna module 355 may be transmitted to the third Rx chain 83 of the transceiver 800 through the third front end 357. The electronic device 300 may reduce the strength of the inflow signal flowing into the third Rx chain 830 by using at least some of the elements included in the third Rx chain 830.

According to an embodiment, the distance between the antenna module 335 and the fourth antenna module 365 may be closer to or meet each other in the folded state of the electronic device 300 compared to the case in which the electronic device 300 is not folded. Accordingly, some of the transmission signal output through the first antenna module 335 may flow into not only the third antenna module 335 but also the fourth antenna module 365. For example, the flow signal having the strength smaller than the signal flowing through the third antenna module 335 may flow through the fourth antenna module 365. In an embodiment, the second antenna module 345 may receive the inflow signal due to interference of the third antenna module 355 and/or the fourth antenna module 364 compared to the case in which the electronic device is not folded. Interference between antenna modules is not limited thereto and it is easily understood by those skilled in the art that interference between antenna modules varies depending on the form, arrangement, folding direction, and/or folding angle of the antenna modules.

According to an embodiment, the electronic device 300 may detect whether the electronic device is folded and/or a folding angle, and change configurations of the elements included in at least one of the first Rx chain 810 to the fourth Rx chain 840 on the basis of at least one of whether the electronic device is folded and/or the folding angle. For example, the electronic device 300 may configure the second Rx chain 820, into which the smallest inflow signal is input, to be different from the element of the third Rx chain 830, into which the largest inflow signal is input, on the basis of whether the electronic device is folded. For example, the electronic device 300 may lower the voltage value of the LO of the mixer (for example, the voltage value of the LO buffer) included in the second Rx chain 820 to be smaller than the voltage value of the buffer of the LO included in the third RX chain.

According to an embodiment, the electronic device 300 may detect folding of the electronic device 300 through a proximity sensor (not shown) or hall sensor (for example, the sensor module 176 of FIG. 1) located in the electronic device 300. However, the electronic device 300 is not limited thereto and may detect folding of the electronic device 300 by further using a gyro sensor, a magnetic sensor, or an acceleration sensor.

According to an embodiment, when the electronic device 300 is folded (or when the electronic device becomes have an angle equal to or smaller than a reference angle), the processor (for example, the processor 120 of FIG. 2) may configure a reference value (for example, a reference point) of the strength of the Tx output signal as a second reference value. In an example, the second reference value may be a value smaller than the first reference value which is the reference value of the strength of the Tx output signal when the electronic device 300 is not folded. The processor 120 may change power of at least one of the elements of the Rx chain electrically connected to at least one antenna module having the distance that becomes shorter by folding of the electronic device 300 and change driving of the circuit on the basis of the second reference value.

According to an embodiment, when the electronic device 300 is folded, it may be determined that the electronic device is folded to have an angle equal to or smaller than a reference angle (for example, 15 degrees) through at least one sensor (for example, the proximity sensor and the hall sensor). When the electronic device 300 is folded to have the angle equal to or smaller than the reference angle (for example, 15 degrees), a high Tx signal may leak to the Rx chain even though a signal having the low strength is output from the Tx chain. Accordingly, the processor (for example, the processor 120 of FIG. 2) may change power of at least one Rx chain and change driving of the circuit in order to prevent or reduce performance deterioration and/or reduce current consumption of the Rx chain according to the Tx output signal flowing into the Rx chain.

TABLE 2

| Tx power (Tx-po) | LNA | Mixer | Active LPF |
|---|---|---|---|
| (Tx-po) < (second reference value) | Decrease VDD voltage value | Decrease LO buffer voltage value | Turn off some of LPFs |
| (Tx-po) > (second reference value) | Increase VDD voltage value | Increase LO buffer voltage value | Turn on some of LPFs |

Referring to FIG. 8A and [Table 2], when the electronic device 300 is folded, the processor 120 may change the reference value for changing the configuration of the Rx chain. Here, the processor 20 may configure the reference value for changing the configuration of the Rx chain as a second reference value lower than a first reference value which is applied when the folded device is not folded.

As an embodiment, when the strength of the Tx output signal is smaller than the second reference value, the processor 120 may lower the VDD voltage value of the LNA. When the strength of the Tx output signal is smaller than the second reference value, the processor 120 may lower the voltage value of the buffer of the local oscillator (LO) of the mixer. When the strength of the Tx output signal is smaller than the second reference value, the processor 120 may turn off an active LPF which attenuates leakage of the Tx output signal among a plurality of active LPFs included in the baseband block. As described above, it is possible to improve the current consumed by the Rx chain by changing power of at least one of the elements of the Rx chain of at least one antenna module approaching each other and changing driving of the circuit when the electronic device 300 is folded.

As an embodiment, the processor 120 may perform only one of controlling the VDD voltage value of the LNA, controlling the voltage value of the buffer of the local oscillator (LO) of the mixer, and turning on/off of the active LPF, perform two or more thereof, or perform all thereof.

As an embodiment, when the strength of the Tx output signal (Tx-po) is larger than the second reference value, the processor 120 may increase the strength of the Tx output signal (for example, inflow signal) flowing into the Rx chain. When the strength of the Tx output signal (Tx-po) is larger than the second reference value, the processor 120 may increase the VDD voltage value of the LNA. However, it is not limited thereto, and the processor 120 may not change the VDD voltage value of the LNA 422 and maintain the initially configured value when the strength of the Tx output signal (Tx-po) is larger than the second reference value.

As an embodiment, when the strength of the Tx output signal (Tx-po) is larger than the second reference value, the processor 120 may increase the voltage value of the buffer of the local oscillator (LO) of the mixer. However, it is not limited thereto, and the processor 120 may not change the voltage value of the LO of the mixer and maintain the initially configured value when the strength of the Tx output signal (Tx-po) is larger than the second reference value. Further, when the strength of the Tx output signal (Tx-po) is larger than the second reference value, the processor 120 may turn on all active LPFs included in the baseband block.

TABLE 3

| Tx power (Tx-po) | LNA | Mixer | Active LPF |
| --- | --- | --- | --- |
| Regardless of Tx-Po | Increase VDD voltage value | Increase LO buffer voltage value | Turn on all LPFs |

As another embodiment, when the electronic device 300 is folded, the configuration of the RX chain may be changed as shown in [Table 3] regardless of the strength of the Tx output signal (Tx-po). When the electronic device 300 is folded, the processor 120 may increase the VDD voltage value of the LNA, increase the voltage value of the buffer of the local oscillator (LO) of the mixer, and turn on all active LPFs included in the baseband block regardless of the strength of the Tx output signal (Tx-po). However, it is not limited thereto, and when the electronic device 300 is folded, the processor 120 may maintain the VDD voltage value of the LNA as the initially configured value, maintain the voltage value of the buffer of the local oscillator (LO) of the mixer as the initially configured value, and turn on all active LPFs included in the baseband block regardless of the strength of the Tx output signal (Tx-po).

Figure 9:
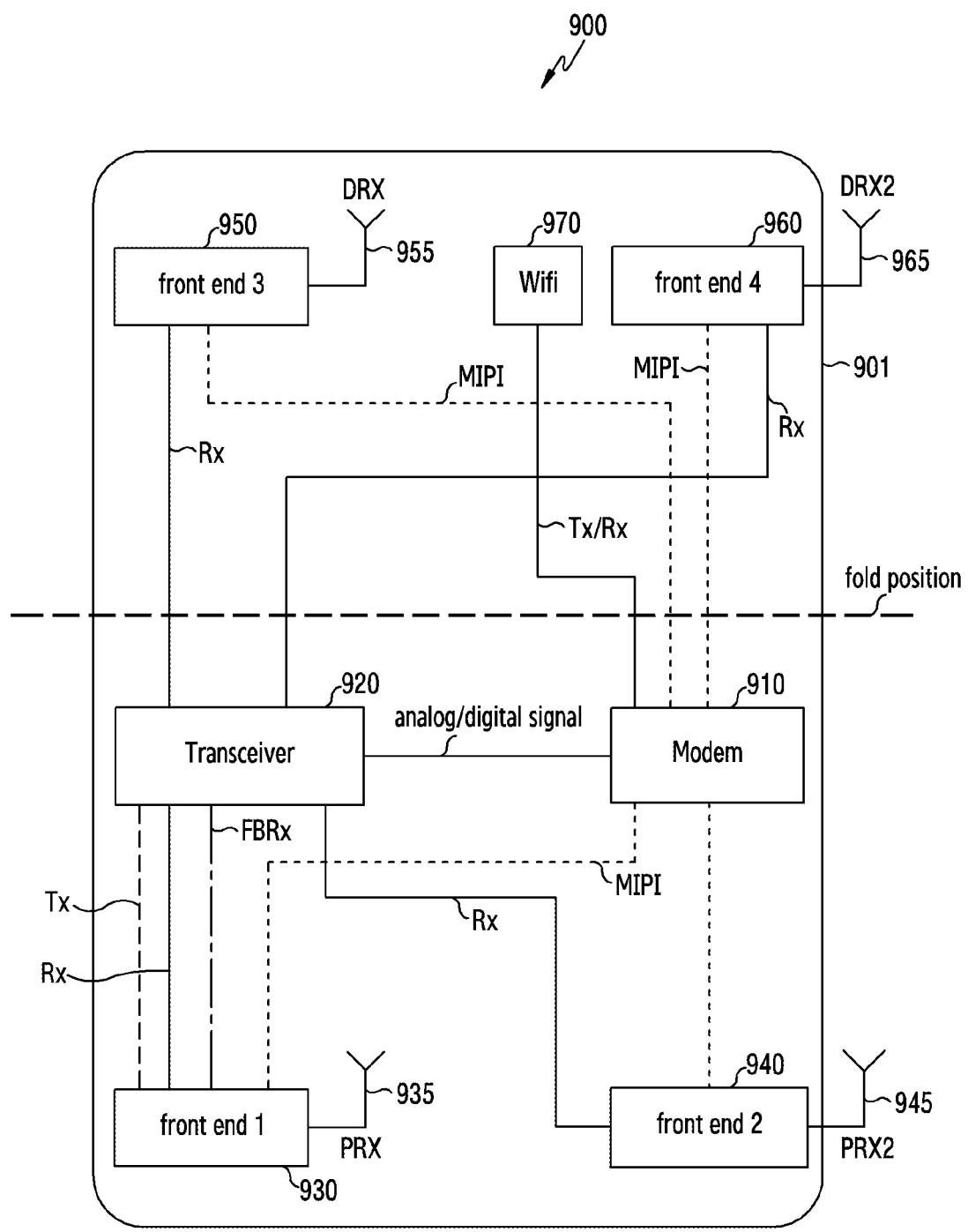
FIG. 9 illustrates the electronic device according to various example embodiments.

FIG. 9 illustrates an electronic device 900 according to various embodiments. In description of the electronic device 900 of FIG. 9, the same description as the electronic device 300 of FIG. 3 may be omitted.

Referring to FIG. 9, the electronic device 900 according to various embodiments may include a modem 910, a transceiver 920, a first front end 930, a second front end 940, a third front end 950, a fourth front end 960, a first antenna module (or, first antenna circuit) 935, a second antenna module (or, second antenna circuit) 945, a third antenna module (or, third antenna circuit) 955, a fourth antenna module (or, fourth antenna circuit) 965, and a Wi-Fi module (or, Wi-Fi circuit) 970 (for example, a front end for short-range communication). The first antenna module 935, the second antenna module 945, the third antenna module 955, and the fourth antenna module 965 may be disposed inside or outside the case 901 of the electronic device 900, and it is easily understood by those skilled in the art that they are not limited to the example illustrated in FIG. 9. For example, the first antenna module 935, the second antenna module 945, the third antenna module 955, and the fourth antenna module 965 may be included in the case 901 or in at least a portion of the case 901.

As an embodiment, a Wi-Fi circuit supporting Wi-Fi communication is described as an example of the Wi-Fi module 970, but it not limited thereto. For example, the Wi-Fi module 970 may include a Bluetooth circuit supporting Bluetooth communication. The first front end 930 is a primary front end and may include a transmission circuit and a reception circuit. The second front end 940 is a primary front end and may include a reception circuit. As an embodiment, the third front end 950 is a diversity (or sub) front end and may include a reception circuit. The fourth front end 960 is a diversity front end and may include a reception circuit.

As an embodiment, the first front end 930 and the first antenna module 935 may be electrically connected. The second front end 940 and the second antenna module 945 may be electrically connected. The third front end 950 and the third antenna module 955 may be electrically connected. The fourth front end 960 and the fourth antenna module 965 may be electrically connected.

TABLE 4

| Tx power (Tx-po) | LNA | Mixer | Active LPF |
| --- | --- | --- | --- |
| When Wi-Fi/BT is turned on | Increase VDD voltage value | Increase LO buffer voltage value | Turn on all LPFs |

As an embodiment, the Wi-Fi module 970 is disposed to be close to the third antenna module 955 and the fourth antenna module 965, and thus may have interference with the third antenna module 955 and the fourth antenna module 965 when the Wi-Fi module 970 is driven. Further, when the electronic device 900 is folded, the Wi-Fi module 970 becomes close to the first antenna module 935 and the second antenna module 945, and thus may have interference with the first antenna module 935 and the second antenna module 945 when the Wi-Fi module 970 is driven.

As an embodiment, when the Wi-Fi module 970 operates (for example, at least one of Wi-Fi/Bluetooth operates), the processor (the processor 120 of FIG. 2) may change the configuration of the Rx chain of at least one antenna module close to the Wi-Fi module 970. For example, the Tx transmission signal output from the Wi-Fi module 970 may flow into the Rx chain electrically connected to the antenna module close to the Wi-Fi module 970. The processor 120 may change the configuration of the Rx chain corresponding to at least one antenna module close to the Wi-Fi module 970.

Referring to [Table 4], as an embodiment, when the Wi-Fi module 970 operates, the processor 120 may increase the VDD voltage value of the LNA of at least one Rx chain close to the Wi-Fi module 970. When the Wi-Fi module 970 operates, the processor 120 may increase the voltage value of the buffer of the local oscillator (LO) of the mixer of at least one Rx chain close to the Wi-Fi module 970. When the Wi-Fi module 970 operates, the processor 120 may turn on all active LPFs included in the baseband block of at least one Rx chain close to the Wi-Fi module 970. Here, when the Wi-Fi module 970 operates, the processor 120 may perform one of the operations of increasing the VDD voltage value of the LNA of the Rx chain, increasing the voltage value of the buffer of the LO of the mixer of the Rx chain, and turning on all active LPFs included in the baseband block of the Rx chain, perform two thereof, or perform all thereof.

An embodiment, when the electronic device 900 is folded, if the Wi-Fi module 970 operates, the configuration of the Rx chain may be changed as shown in [Table 3]. Further, the configuration of the Rx chain may be changed as shown in [Table 3] regardless of whether the Wi-Fi module 970 operates. When the electronic device 900 is folded, the processor 120 may increase the VDD power value of the LNA, increase the voltage value of the buffer of the local oscillator (LO) of the mixer, and turn on all active LPFs included in the baseband block. However, it is not limited thereto, and when the electronic device 900 is folded, the processor 120 may maintain the VDD voltage value of the LNA as the initially configured value, maintain the voltage value of the buffer of the local oscillator (LO) of the mixer as the initially configured value, and turn on all active LPFs included in the baseband block.

Figure 10:
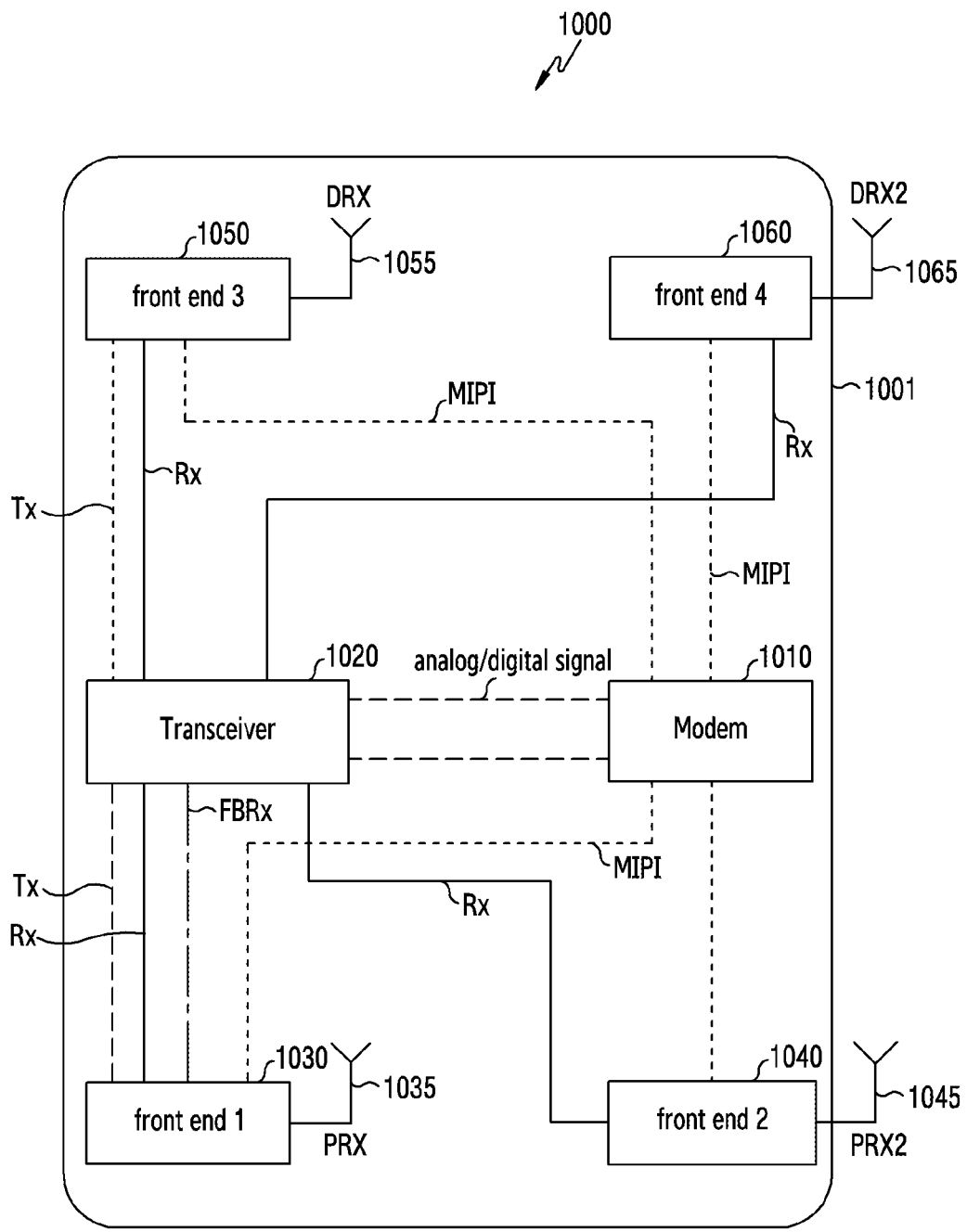
FIG. 10 illustrates the electronic device supporting an EN-DC scheme according to various example embodiments.

FIG. 10 illustrates an electronic device 1000 according to various embodiments. In description of the electronic device 1000 of FIG. 10, the same description as the electronic device 300 of FIG. 3 may be omitted.

Referring to FIG. 10, the electronic device 1000 according to various embodiments may include a modem 1010, a transceiver 1020, a first front end 1030, a second front end 1040, a third front end 1050, a fourth front end 1060, a first antenna module (or, first antenna circuit) 1035, a second antenna module (or, second antenna circuit) 1045, a third antenna module (or, third antenna circuit) 1055, and a fourth antenna module (or, fourth antenna circuit) 1065. The first antenna module 1035, the second antenna module 1045, the third antenna module 1055, and the fourth antenna module 1065 may be disposed inside or outside the case 1000 of the electronic device 1001, and it is easily understood by those skilled in the art that they are not limited to the example illustrated in FIG. 10. For example, the first antenna module 1035, the second antenna module 1045, the third antenna module 1055, and the fourth antenna module 1065 may be included in the case 1001.

As an embodiment, the first front end 1030 may operate as a first E-UTRA NR dual connectivity (EN-DC) front end. The first front end 1030 may be a front end simultaneously supporting a transmission (Tx) and reception (for example, PRX) path of legacy communication (for example, LTE) and a reception (for example, DRX2) path of new radio (NR) (for example, 5G). As an embodiment, the second front end 1040 may operate as a second EN-DC front end. The second front end 1040 may operate as a front end simultaneously supporting an LTE reception (for example, PRX) path and an NR reception (for example, DRX) path. As an embodiment, the third front end 1050 may operate as a third EN-DC front end. The third front end 1050 may operate as a front end simultaneously supporting an LTE reception (for example, PRX) path and an NR transmission (Tx) and reception (for example, PRX) path. As an embodiment, the fourth front end 1060 may operate as a fourth EN-DC front end. The fourth front end 1060 may operate as a front end simultaneously supporting an LTE reception (for example, DRX) path and an NR reception (for example, PRX2) path.

As an embodiment, the first front end 1030 and the first antenna module 1035 may be electrically connected, directly or indirectly. The second front end 1040 and the second antenna module 1045 may be electrically connected. The third front end 1050 and the third antenna module 1055 may be electrically connected, directly or indirectly. The fourth front end 1060 and the fourth antenna module 1065 may be electrically connected, directly or indirectly.

As an embodiment, when the electronic device 101 operates in E-UTRA NR dual connectivity (EN-DC), power of at least one of the elements included in the Rx chain may be changed and driving of the circuit may be changed separately in (1) the case of similar frequency bands and (2) the case of different frequency bands.

As an embodiment, when EN-DC is applied, the processor 120 may largely divide similar bands (for example, middle band (MB)-middle band (MB)) into four cases (case #1 to case #4) as shown in [Table 5], and change power of at least one of the elements included in the Rx chain and change driving of the circuit.

As an embodiment, the processor 120 may configure a reference value (for example, a reference point) of the strength of the Tx output signal of LTE for changing power of at least one of the elements included in the Rx chain and changing driving of the circuit as a third reference value. The processor 120 may configure the reference value of the strength of the Tx output signal of NR for changing power of at least one of the elements included in the Rx chain and changing driving of the circuit as a fourth reference value.

TABLE 5

| Tx power(Tx-po) (similar band EN-DC) | | LNA | Mixer | Active LPF |
|---|---|---|---|---|
| case#1 | (Tx-po) < (third reference value) [LTE] | Decrease VDD voltage value [LTE] | Decrease LO voltage value [LTE] | Turn off some LPFs [LTE] |
|  | (Tx-po) < (fourth reference value) [NR] | Decrease VDD voltage value [NR] | Decrease LO voltage value [NR] | Turn off some LPFs [NR] |
| case#2 | (Tx-po) > (third reference value) [LTE] | Fix or increase VDD voltage value [LTE] | Fix or increase LO voltage value [LTE] | Turn on all LPFs [LTE] |
|  | (Tx-po) < (fourth reference value) [NR] | Fix or increase VDD voltage value [NR] | Fix or increase LO voltage value [NR] | Turn on all LPFs [NR] |
| case#3 | (Tx-po) < (third reference value [LTE] | Fix or increase VDD voltage value [LTE] | Fix or increase LO voltage value [LTE] | Turn on all LPFs [LTE] |
|  | (Tx-po) > (fourth reference value) [NR] | Fix or increase VDD voltage value [NR] | Fix or increase LO voltage value [NR] | Turn on all LPFs [NR] |
| case#4 | (Tx-po) > (third reference value) [LTE] | Fix or increase VDD voltage value [LTE] | Fix or increase LO voltage value [LTE] | Turn on all LPFs [LTE] |
|  | (Tx-po) > (fourth reference value) [NR] | Fix or increase VDD voltage value [NR] | Fix or increase LO voltage value [NR] | Turn on all LPFs [NR] |

In case #1 of [Table 5], as an embodiment, when the strength of the Tx output signal (Tx-po) of LTE is smaller than the third reference value, the Tx output signal having the low strength (for example, inflow signal) may flow into the first Rx chain. The processor 120 may change power of at least one of the elements included in the first Rx chain located in the LTE Rx chain and change driving of the circuit. When the Tx output signal having the low strength (for example, inflow signal) flows into the first Rx chain, the processor 120 may lower the VDD voltage value of the LNA (for example, LNA 422 of FIG. 4) of the first Rx chain, lower the voltage value of the buffer of the LO (for example, LO 424a of FIG. 4) of the mixer of the first Rx chain, and turn off some LPFs (for example, active LPFs 426b of FIG. 4) of the first Rx chain in the LTE path. Here, the processor 120 may perform one of the operations of lowering the VDD voltage value of the LNA of the Rx chain, lowering the voltage value of the buffer of the LO of the mixer of the Rx chain, and turning off some active LPFs included in the baseband block of the Rx chain, perform two operations, or perform all of the three operations.

As an embodiment, when the strength of the Tx output signal (Tx-po) of NR is smaller than the fourth reference value, the Tx output signal having the low strength (for example, inflow signal) may flow into the second Rx chain. Accordingly, when the Tx output signal having the low strength (for example, inflow signal) flows into the Rx chain, the processor 120 may change power of at least one of the elements included in the second Rx chain located in the NR Rx path and change driving of the circuit. The processor 120 may lower the VDD voltage value of the LNA of the second Rx chain, lower the voltage value of the LO buffer of the mixer of the second Rx chain, and turn off some LPFs of the second Rx chain in the NR path. Here, the processor 120 may perform one of the operations of lowering the VDD voltage value of the LNA of the Rx chain, lowering the voltage value of the buffer of the LO of the mixer of the Rx chain, and turning off some active LPFs included in the baseband block of the Rx chain, perform two operations, or perform all of the three operations.

In case #2 of [Table 5], as an embodiment, when the strength of the Tx output signal (Tx-po) of LTE is larger than the third reference value, the processor 120 may change power of at least one of the elements included in the first Rx chain located in the LTE Rx path and change driving of the circuit. The Tx output signal having the high strength (for example, inflow signal) may flow into the first Rx chain. When the Tx output signal having the high strength (for example, inflow signal) flows into the first Rx chain, the processor 120 may increase the VDD voltage value of the LNA of the first Rx chain (or maintain the initially configured voltage value), increase the voltage value of the LO buffer of the mixer of the first Rx chain (or maintain the initially configured voltage value), and turn on all LPFs of the first Rx chain in the LTE path. Here, the processor 120 may perform one of the operations of increasing the VDD voltage value of the LNA of the Rx chain (or maintaining the initially configured voltage value), increasing the voltage value of the buffer of the LO of the mixer of the Rx chain (or maintaining the initially configured voltage value), and turning on all LPFs included in the baseband block of the Rx chain, perform two operations, or perform all of the three operations.

As an embodiment, when the strength of the Tx output signal (Tx-po) of NR is smaller than the fourth reference value, the processor 120 may change power of the second Rx chain located in the NR Rx path and change driving of the circuit. When the strength of the Tx output signal (Tx-po) of LTE is larger than the third reference value even through the strength of the Tx output signal (Tx-po) of NR is smaller than the fourth reference value, the Tx output signal having the high strength (for example, inflow signal) may flow into the second Rx chain. When the Tx output signal having the high strength (for example, inflow signal) flows into the second Rx chain, the processor 120 may increase the VDD voltage value of the LNA of the second Rx chain (or maintain the initially configured voltage value), increase the voltage value of the LO buffer of the mixer of the second Rx chain (or maintain the initially configured voltage value), and turn on all LPFs of the second Rx chain in the NR path. Here, the processor 120 may perform one of the operations of increasing the VDD voltage value of the LNA of the Rx chain (or maintaining the initially configured voltage value), increasing the voltage value of the buffer of the LO of the mixer of the Rx chain (or maintaining the initially configured voltage value), and turning on all LPFs included in the baseband block of the Rx chain, perform two operations, or perform all of the three operations.

In case #3 of [Table 5], as an embodiment, when the strength of the Tx output signal (Tx-po) of LTE is smaller than the third reference value, the processor 120 may change power of at least one of the elements included in the first Rx chain located in the LTE Rx path and change driving of the circuit. When the strength of the Tx output signal (Tx-po) of NR is larger than the fourth reference value even through the strength of the Tx output signal (Tx-po) of LTE is smaller than the third reference value, the Tx output signal having the high strength (for example, inflow signal) may flow into the first Rx chain. Accordingly, when the Tx output signal having the high strength (for example, inflow signal) flows into the first Rx chain, the processor 120 may increase the VDD voltage value of the LNA of the first Rx chain (or maintain the initially configured voltage value), increase the voltage value of the LO buffer of the mixer of the first Rx chain (or maintain the initially configured voltage value), and turn on all LPFs of the first Rx chain in the LTE path. Here, the processor 120 may perform one of the operations of increasing the VDD voltage value of the LNA of the Rx chain (or maintaining the initially configured voltage value), increasing the voltage value of the buffer of the LO of the mixer of the Rx chain (or maintaining the initially configured voltage value), and turning on all LPFs included in the baseband block of the Rx chain, perform two operations, or perform all of the three operations.

As an embodiment, when the Tx output signal (Tx-po) of NR is larger than the fourth reference value, the processor 120 may change power of at least one of the elements included in the second Rx chain located in the NR Rx path and change driving of the circuit. When the strength of the Tx output signal (Tx-po) of NR is larger than the fourth reference value, the Tx output signal having the high strength may flow into the second Rx chain. Accordingly, when the Tx output signal having the high strength flows into the second Rx chain, the processor 120 may increase the VDD voltage value of the LNA of the second Rx chain (or maintain the initially configured voltage value), increase the voltage value of the LO buffer of the mixer of the second Rx chain (or maintain the initially configured voltage value), and turn on all LPFs of the second Rx chain in the NR path. Here, the processor 120 may perform one of the operations of increasing the VDD voltage value of the LNA of the Rx chain (or maintaining the initially configured voltage value), increasing the voltage value of the buffer of the LO of the mixer of the Rx chain (or maintaining the initially configured voltage value), and turning on all LPFs included in the baseband block of the Rx chain, perform two operations, or perform all of the three operations.

In case #4 of [Table 5], as an embodiment, when the strength of the Tx output signal (Tx-po) of LTE is larger than the third reference value, the processor 120 may change power of at least one of the elements included in the first Rx chain located in the LTE Rx path and change driving of the circuit. When the strength of the Tx output signal (Tx-po) of LTE is larger than the third reference value, the Tx output signal having the high strength (for example, inflow signal) may flow into the first Rx chain. Accordingly, when the Tx output signal having the high strength (for example, inflow signal) flows into the first Rx chain, the processor 120 may increase the VDD voltage value of the LNA of the first Rx chain (or maintain the initially configured voltage value), increase the voltage value of the LO buffer of the mixer of the first Rx chain (or maintain the initially configured voltage value), and turn on all LPFs of the first Rx chain in the LTE path. Here, the processor 120 may perform one of the operations of increasing the VDD voltage value of the LNA of the Rx chain (or maintaining the initially configured voltage value), increasing the voltage value of the buffer of the LO of the mixer of the Rx chain (or maintaining the initially configured voltage value), and turning on all LPFs included in the baseband block of the Rx chain, perform two operations, or perform all of the three operations.

As an embodiment, when the Tx output signal (Tx-po) of NR is larger than the fourth reference value, the processor 120 may change power of at least one of the elements included in the second Rx chain located in the NR Rx path and change driving of the circuit. When the strength of the Tx output signal (Tx-po) of NR is larger than the fourth reference value, the Tx output signal having the high strength may flow into the second Rx chain. Accordingly, when the Tx output signal having the high strength flows into the second Rx chain, the processor 120 may increase the VDD voltage value of the LNA of the second Rx chain (or maintain the initially configured voltage value), increase the voltage value of the LO buffer of the mixer of the second Rx chain (or maintain the initially configured voltage value), and turn on all LPFs of the second Rx chain in the NR path. Here, the processor 120 may perform one of the operations of increasing the VDD voltage value of the LNA of the Rx chain (or maintaining the initially configured voltage value), increasing the voltage value of the buffer of the LO of the mixer of the Rx chain (or maintaining the initially configured voltage value), and turning on all LPFs included in the baseband block of the Rx chain, perform two operations, or perform all of the three operations.

As an embodiment, when 5G EN-DC is applied, the processor 120 may largely divide the cases into four cases (case #1 to case #4) for different bands (for example, middle band (MB) and low band (LB)) as illustrated in FIG. 6 and change the configuration of the RX chains.

As an embodiment, the processor 120 may configure a reference value (for example, a reference point) of the strength of the Tx output signal of LTE for changing power of at least one of the elements included in the Rx chain and changing driving of the circuit as a third reference value. The processor 120 may configure the reference value of the strength of the Tx output signal of NR for changing power of at least one of the elements included in the Rx chain and changing driving of the circuit as a fourth reference value.

TABLE 6

| Tx power(Tx-po) (different bands EN-DC) | | LNA | Mixer | Active LPF |
|---|---|---|---|---|
| case#1 | (Tx-po) < (third reference value) [LTE] | Decrease VDD voltage value [LTE] | Decrease LO voltage value [LTE] | Turn off some LPFs [LTE] |
| | (Tx-po) < (fourth reference value [NR] | Decrease VDD voltage value [NR] | Decrease LO voltage value [NR] | Turn off some LPFs [NR] |

TABLE 6-continued

| Tx power(Tx-po) (different bands EN-DC) | | LNA | Mixer | Active LPF |
|---|---|---|---|---|
| case#2 | (Tx-po) > (third reference value) [LTE] | Increase VDD voltage value [LTE] | Increase LO voltage value [LTE] | Turn on all LPFs [LTE] |
| | (Tx-po) < (fourth reference value) [NR] | Decrease VDD voltage value [NR] | Decrease LO voltage value [NR] | Turn off some LPFs[NR] |
| case#3 | (Tx-po) < (third reference value) [LTE] | Decrease VDD voltage value [LTE] | Decrease LO voltage value [LTE] | Turn off some LPFs [LTE] |
| | (Tx-po) > (fourth reference value) [NR] | Increase VDD voltage value [NR] | Increase LO voltage value [NR] | Turn on all LPFs [NR] |
| case#4 | (Tx-po) > (third reference value) [LTE] | Increase VDD voltage value [LTE] | Increase LO voltage value [LTE] | Turn on all LPFs [LTE] |
| | (Tx-po) > (fourth reference value) [NR] | Increase VDD voltage value [NR] | Increase LO voltage value [NR] | Turn on all LPFs [NR] |

In case #1 of [Table 6], as an embodiment, when the strength of the Tx output signal (Tx-po) of LTE is smaller than the third reference value, the processor 120 may change power of at least one of the elements included in the first Rx chain located in the LTE Rx path and change driving of the circuit. When the strength of the Tx output signal (Tx-po) of LTE is smaller than the third reference value, the Tx output signal having the low strength (for example, inflow signal) may flow into the first Rx chain. Accordingly, when the Tx output signal having the low strength (for example, inflow signal) flows into the first Rx chain, the processor 120 may lower the VDD voltage value of the LNA of the first Rx chain, lower the voltage value of the LO buffer of the mixer of the first Rx chain, and turn off some LPFs of the first Rx chain in the LTE path. Here, the processor 120 may perform one of the operations of lowering the VDD voltage value of the LNA of the Rx chain, lowering the voltage value of the buffer of the LO of the mixer of the Rx chain, and turning off some active LPFs included in the baseband block of the Rx chain, perform two operations, or perform all of the three operations.

As an embodiment, when the strength of the Tx output signal (Tx-po) of NR is smaller than the fourth reference value, the processor 120 may change power of the second Rx chain located in the NR Rx path and change driving of the circuit. When the strength of the Tx output signal (Tx-po) of NR is smaller than the fourth reference value, the Tx output signal having the low strength (for example, inflow signal) may flow into the second Rx chain. Accordingly, when the Tx output signal having the low strength (for example, inflow signal) flows into the second Rx chain, the processor 120 may lower the VDD voltage value of the LNA of the second Rx chain, lower the voltage value of the LO buffer of the mixer of the second Rx chain, and turn off some LPFs of the second Rx chain in the NR path. Here, the processor 120 may perform one of the operations of lowering the VDD voltage value of the LNA of the Rx chain, lowering the voltage value of the buffer of the LO of the mixer of the Rx chain, and turning off some active LPFs included in the baseband block of the Rx chain, perform two operations, or perform all of the three operations.

In case #2 of [Table 6], as an embodiment, when the strength of the Tx output signal (Tx-po) of LTE is larger than the third reference value, the processor 120 may change power of at least one of the elements included in the first Rx chain located in the LTE Rx path and change driving of the circuit. When the strength of the Tx output signal (Tx-po) of LTE is larger than the third reference value, the Tx output signal having the high strength (for example, inflow signal) may flow into the first Rx chain. Accordingly, when the Tx output signal having the high strength (for example, inflow signal) flows into the first Rx chain, the processor 120 may increase the VDD voltage value of the LNA of the first Rx chain (or maintain the initially configured voltage value), increase the voltage value of the LO buffer of the mixer of the first Rx chain (or maintain the initially configured voltage value), and turn on all LPFs of the first Rx chain in the LTE path. Here, the processor 120 may perform one of the operations of increasing the VDD voltage value of the LNA of the Rx chain (or maintaining the initially configured voltage value), increasing the voltage value of the buffer of the LO of the mixer of the Rx chain (or maintaining the initially configured voltage value), and turning on all LPFs included in the baseband block of the Rx chain, perform two operations, or perform all of the three operations.

As an embodiment, when the strength of the Tx output signal (Tx-po) of NR is smaller than the fourth reference value, the processor 120 may change power of at least one of the elements included in the second Rx chain located in the NR Rx path and change driving of the circuit. When the strength of the Tx output signal (Tx-po) is smaller than the fourth reference value, the Tx output signal having the low strength (for example, inflow signal) may flow into the second Rx chain. Accordingly, when the Tx output signal having the low strength (for example, inflow signal) flows into the second Rx chain, the processor 120 may lower the VDD voltage value of the LNA of the second Rx chain, lower the voltage value of the LO buffer of the mixer of the second Rx chain, and turn off some LPFs of the second Rx chain in the NR path. Here, the processor 120 may perform one of the operations of lowering the VDD voltage value of the LNA of the Rx chain, lowering the voltage value of the buffer of the LO of the mixer of the Rx chain, and turning off some active LPFs included in the baseband block of the Rx chain, perform two operations, or perform all of the three operations.

In case #3 of [Table 6], as an embodiment, when the strength of the Tx output signal (Tx-po) of LTE is smaller than the third reference value, the processor 120 may change power of at least one of the elements included in the first Rx chain located in the LTE Rx path and change driving of the circuit. When the strength of the Tx output signal (Tx-po) of LTE is smaller than the third reference value, the Tx output signal having the low strength (for example, inflow signal) may flow into the first Rx chain. Accordingly, when the Tx output signal having the low strength (for example, inflow signal) flows into the first Rx chain, the processor 120 may lower the VDD voltage value of the LNA of the first Rx chain, lower the voltage value of the LO buffer of the mixer of the second Rx chain, and turn off some LPFs of the first Rx chain in the LTE path. Here, the processor 120 may perform one of the operations of lowering the VDD voltage value of the LNA of the Rx chain, lowering the voltage value of the buffer of the LO of the mixer of the Rx chain, and turning off some active LPFs included in the baseband block of the Rx chain, perform two operations, or perform all of the three operations.

As an embodiment, when the Tx output signal (Tx-po) of NR is larger than the fourth reference value, the processor 120 may change power of at least one of the elements included in the second Rx chain located in the NR Rx path and change driving of the circuit. When the strength of the Tx output signal (Tx-po) of NR is larger than the fourth reference value, the Tx output signal having the high strength (for example, inflow signal) may flow into the second Rx chain. When the Tx output signal having the high strength (for example, inflow signal) flows into the second Rx chain, the processor 120 may increase the VDD voltage value of the LNA of the second Rx chain (or maintain the initially configured voltage value), increase the voltage value of the LO buffer of the mixer of the second Rx chain (or maintain the initially configured voltage value), and turn on all LPFs of the second Rx chain in the NR path. Here, the processor 120 may perform one of the operations of increasing the VDD voltage value of the LNA of the Rx chain (or maintaining the initially configured voltage value), increasing the voltage value of the buffer of the LO of the mixer of the Rx chain (or maintaining the initially configured voltage value), and turning on all LPFs included in the baseband block of the Rx chain, perform two operations, or perform all of the three operations.

In case #4 of [Table 6], as an embodiment, when the strength of the Tx output signal (Tx-po) of LTE is larger than the third reference value, the processor 120 may change power of at least one of the elements included in the first Rx chain located in the LTE Rx path and change driving of the circuit. When the strength of the Tx output signal (Tx-po) of LTE is larger than the third reference value, the Tx output signal having the high strength (for example, inflow signal) may flow into the first Rx. Accordingly, when the Tx output signal having the high strength (for example, inflow signal) flows into the first Rx chain, the processor 120 may increase the VDD voltage value of the LNA of the first Rx chain (or maintain the initially configured voltage value), increase the voltage value of the LO buffer of the mixer of the first Rx chain (or maintain the initially configured voltage value), and turn on all LPFs of the first Rx chain in the LTE path. Here, the processor 120 may perform one of the operations of increasing the VDD voltage value of the LNA of the Rx chain (or maintaining the initially configured voltage value), increasing the voltage value of the buffer of the LO of the mixer of the Rx chain (or maintaining the initially configured voltage value), and turning on all LPFs included in the baseband block of the Rx chain, perform two operations, or perform all of the three operations.

As an embodiment, when the Tx output signal (Tx-po) of NR is larger than the fourth reference value, the processor 120 may change power of at least one of the elements included in the second Rx chain located in the NR Rx path and change driving of the circuit. When the strength of the Tx output signal (Tx-po) of NR is larger than the fourth reference value, the Tx output signal having the high strength (for example, inflow signal) may flow into the second Rx chain. When the Tx output signal having the high strength (for example, inflow signal) flows into the second Rx chain, the processor 120 may increase the VDD voltage value of the LNA of the second Rx chain (or maintain the initially configured voltage value), increase the voltage value of the LO buffer of the mixer of the second Rx chain (or maintain the initially configured voltage value), and turn on all LPFs of the second Rx chain in the NR path. Here, the processor 120 may perform one of the operations of increasing the VDD voltage value of the LNA of the Rx chain (or maintaining the initially configured voltage value), increasing the voltage value of the buffer of the LO of the mixer of the Rx chain (or maintaining the initially configured voltage value), and turning on all LPFs included in the baseband block of the Rx chain, perform two operations, or perform all of the three operations.

Figure 11:
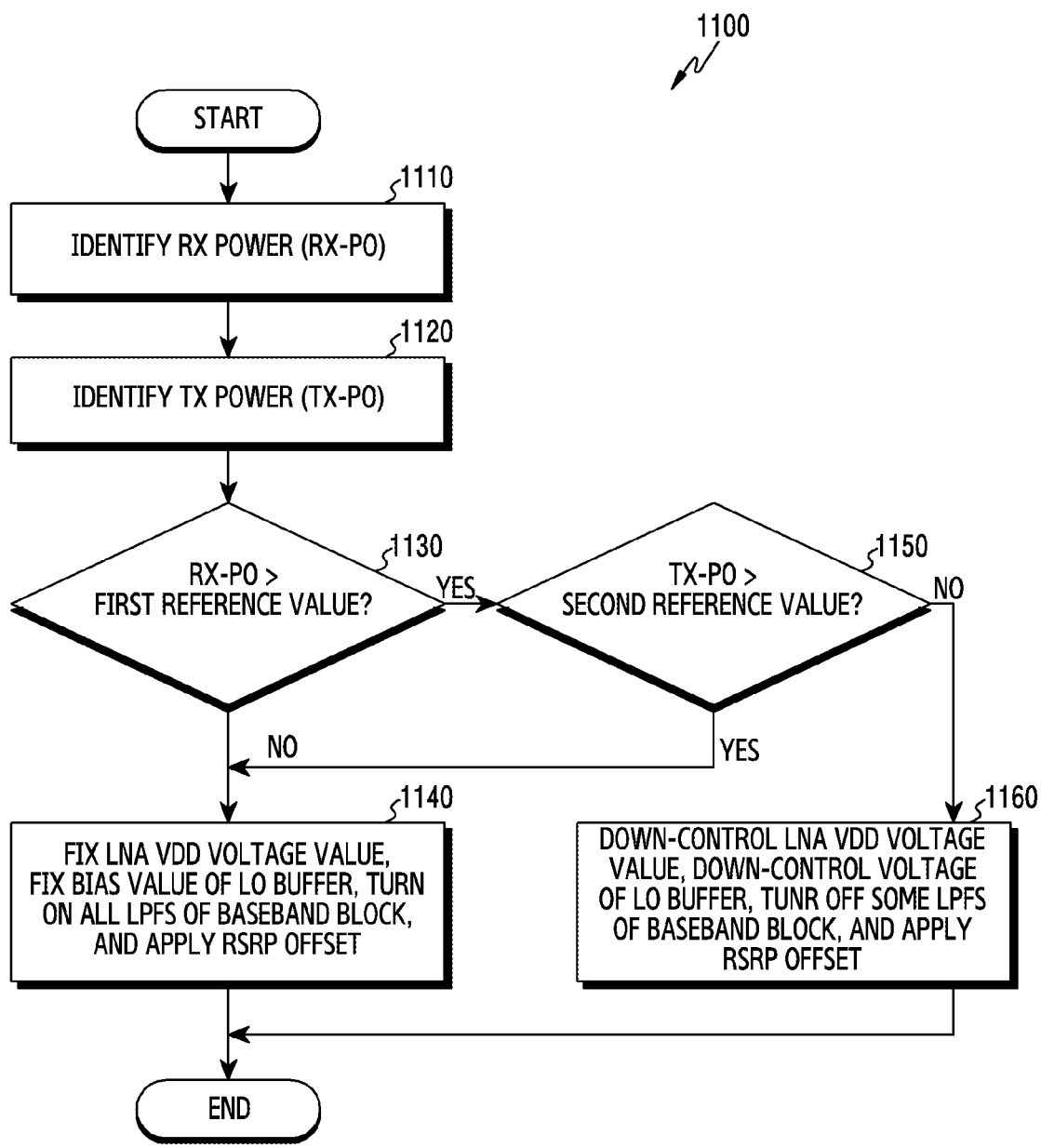
FIG. 11 illustrates an example of a method of changing configurations of Rx chains according to the strength of Tx output signals.

FIG. 11 is a diagram 1100 illustrating an example of a method of changing the configuration of the Rx chain according to the strength of the Tx output signal.

Referring to FIG. 11, in operation 1100, a processor (for example, the processor 120 of FIG. 2) may identify the strength of the Rx signal (Rx-po).

In operation 1120, the processor 120 may identify the strength of the Tx output signal (Tx-po) output from each Tx chain.

In operation 1130, the processor 120 may determine whether the strength of the Rx signal (Rx-po) is larger than a preset first reference value (Rx-po>first reference value).

When the strength of the Rx signal (Rx-po) is not larger than the preset first reference value on the basis of the determination result of operation 1130, operation 1140 may be performed.

In operation 1140, the processor 120 may maintain the initially configured voltage value without controlling the LNA VDD value, maintain the initially configured voltage value without controlling the voltage value of the LO buffer, turn on all LPFs of the baseband block, and apply a reference signal received power (RSRP) offset. The RSRP offset may be configured in a lookup table form and may be stored in a memory of a modem (for example, the modem 310 of FIG. 3). The processor 120 may read the RSRP offset in the lookup table form from the memory and apply the same.

When the strength of the Rx signal (Rx-po) is larger than the preset first reference value on the basis of the determination result of operation 1130, operation 1150 may be performed.

In operation 1150, the processor 120 may determine whether the strength of the Tx output signal (Tx-po) is larger than a second reference value (Tx-po>second reference value).

When the strength of the Tx output signal (Tx-po) is larger than the preset second reference signal on the basis of the determination result of operation 1150, operation 1140 may be performed.

When the strength of the Tx output signal (Tx-po) is not larger than the preset second reference value on the basis of the determination result of operation 1150, the processor 120 may perform operation 1160.

In operation 1160, the processor 120 may lower the LNA VDD voltage value, lower the voltage value of the LO buffer, turn off some LPFs of the baseband block, and apply the RSRP offset. It is possible to generate a change in a gain by controlling the voltage value of the LO buffer of the mixer (for example, the mixer 424 of FIG. 4) or changing the VDD value of the LNA (for example, the LNA 422 of FIG. 4). Accordingly, the processor 120 may read the preset RSRP offset from the memory of the modem (for example, the modem 310 of FIG. 3) and apply the same in order to compensate for the RSRP in operation 1160. Therefore, the same RPRP may be indicated in spite of the generation of a gain deviation according to the strength of the Tx output signal.

Figure 12:
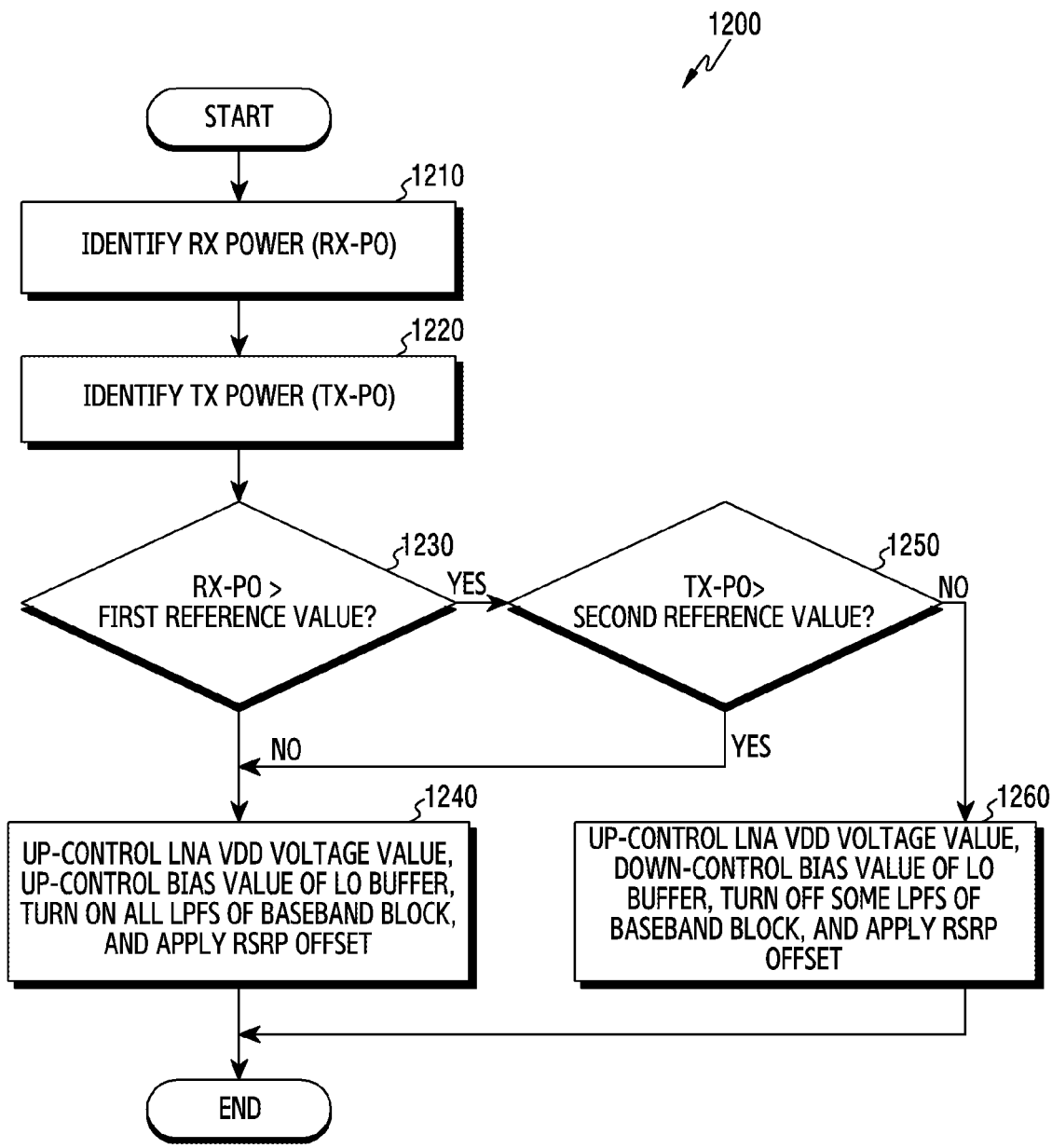
FIG. 12 illustrates an example of a method of changing configurations of Rx chains according to the strength of Tx output signals.

FIG. 12 is a diagram 1200 illustrating an example of a method of changing the configuration of the Rx chain according to the strength of the Tx output signal.

Referring to FIG. 12, the processor (for example, the processor 120 of FIG. 2) may identify the strength of the Rx signal (Rx-po) in operation 1210.

The processor 120 may identify the strength of the Tx output signal output from the Tx chain in operation 1220.

In operation 1230, the processor 120 may determine whether the strength of the Rx signal (Rx-po) is larger than a preset first reference value (Rx-po>first reference value).

When the strength of the Rx signal (Rx-po) is not larger than the preset first reference value on the basis of the determination result of operation 1230, operation 1240 may be performed.

In operation 1240, the processor 120 may increase the LNA VDD value, increase the voltage value of the LO buffer, turn on all LPFs of the baseband block, and apply the reference signal received power (RSRP) offset. The RSRP offset may be configured in a lookup table form and may be stored in a memory of a modem (for example, the modem 310 of FIG. 3). The processor 120 may load and apply the RSRP offset in the lookup table form.

When the strength of the Rx signal (Rx-po) is larger than the preset first reference value on the basis of the determination result of operation 1230, operation 1250 may be performed.

In operation 1250, the processor 120 may determine whether the strength of the Tx output signal (Tx-po) is larger than a second reference value (Tx-po>second reference value).

When the strength of the Tx output signal (Tx-po) is larger than the preset second reference signal on the basis of the determination result of operation 1250, operation 1240 may be performed.

When the strength of the Tx output signal (Tx-po) is not larger than the preset second reference value on the basis of the determination result of operation 1250, the processor 120 may perform operation 1260.

In operation 1260, the processor 120 may lower the LNA VDD voltage value, lower the voltage value of the LO buffer, turn off some LPFs of the baseband block, and apply the RSRP offset, It is possible to generate a change in a gain by controlling the voltage value of the LO buffer of the mixer (for example, the mixer 424 of FIG. 4) or changing the VDD value of the LNA (for example, the LNA 422 of FIG. 4). Accordingly, the processor 120 may read the preset RSRP offset from the memory of the modem (for example, the modem 310 of FIG. 3) and apply the same in order to compensate for the RSRP in operation 1260. Therefore, the same RPRP may be indicated in spite of the generation of a gain deviation according to the strength of the Tx output signal.

Figure 13:
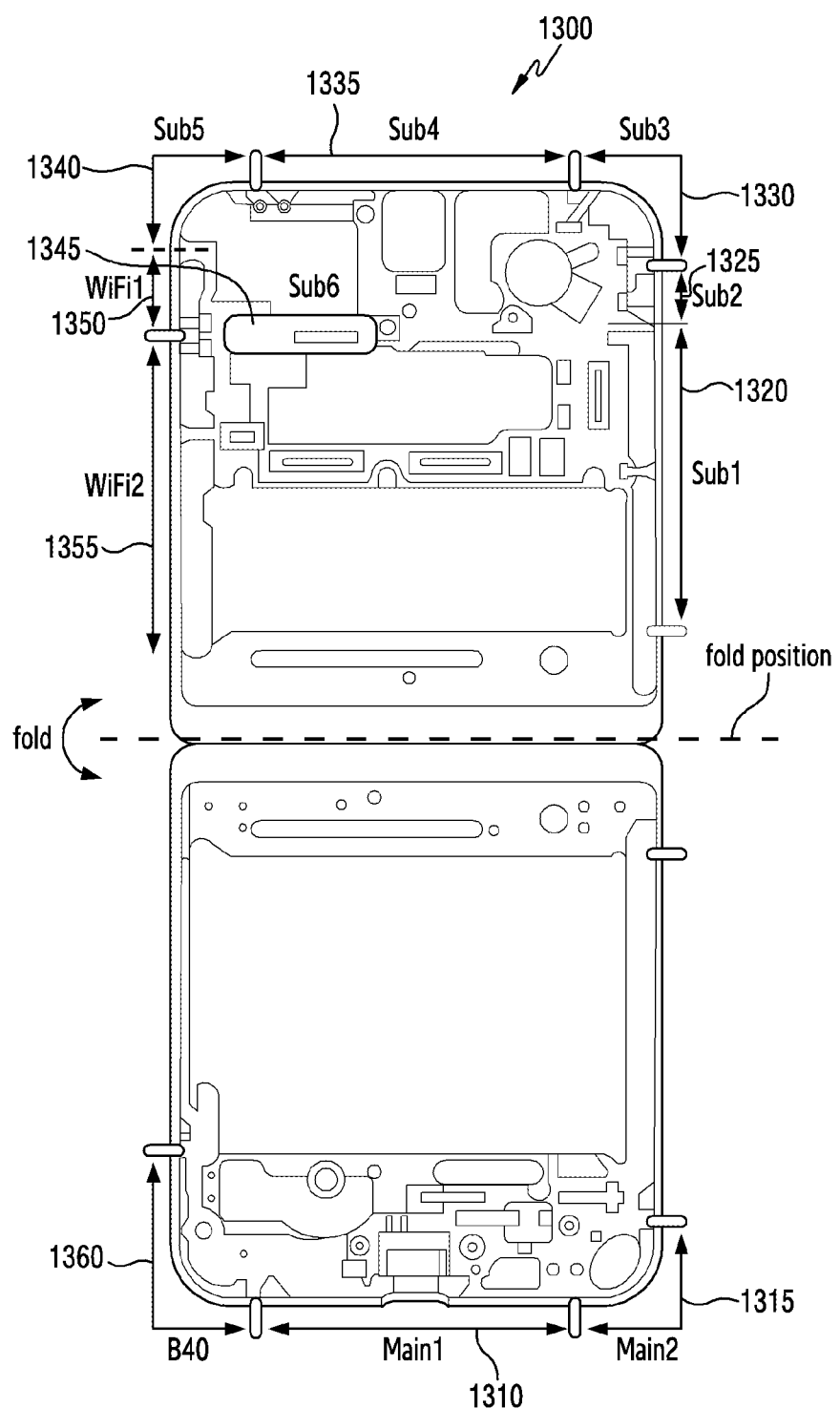
FIG. 13 illustrates the electronic device according to various example embodiments.

FIG. 13 illustrates an electronic device 1300 according to various embodiments. In description of the electronic device 1300 of FIG. 13, the same description as the electronic device 300 of FIG. 3 may be omitted.

Referring to FIG. 5A and FIG. 13, the electronic device 1300 according to various embodiments may be a foldable device. The electronic device 1300 may include a fold position. For example, when the electronic device 1300 is folded on the basis of the fold position, one part of the electronic device 1300 and the other part thereof may face and approach each other.

As an embodiment, the electronic device 1300 may include a modem (for example, the modem 310 of FIG. 3), a transceiver (for example, the transceiver 320 of FIG. 3), a first front end (for example, the first front end 330 of FIG. 3), a second front end (for example, the second front end 340 of FIG. 3), a Wi-Fi module (for example, the Wi-Fi module 970 of FIG. 9), and a plurality of sub front ends. Further, the electronic device 1300 may include a first antenna module 1310 (first main antenna module), a second antenna module 1315 (second main antenna module), a third antenna module 1320 (sub1 antenna module), a fourth antenna module 1325 (for example, sub2 antenna module), a fifth antenna module 1330 (for example, sub3 antenna module), a sixth antenna module 1335 (for example, sub4 antenna module), a seventh antenna module 1340 (for example, sub5 antenna module), an eighth antenna module 1345 (for example, sub6 antenna module), a ninth antenna module 1360 (for example, LTE B40 antenna module), a first Wi-Fi antenna module 1350, and a second Wi-Fi antenna module 1355.

As an embodiment, the Wi-Fi circuit supporting Wi-Fi communication has been described as an example of the Wi-Fi module, but the disclosure is not limited thereto. For example, a Bluetooth circuit supporting Bluetooth communication may be included. The first front end is a primary front end and may include a transmission circuit and a reception circuit. The second front end is a primary end and may include a reception circuit.

As an embodiment, the electronic device 1300 may include a plurality of antenna modules 1310 to 1360, and thus gaps between the plurality of antenna modules 1310 to 1360 may be narrow.

Accordingly, the Tx output signal (for example, inflow signal) of at least one Tx path may flow (or leak) into at least one Rx chain. When the electronic device 1300 is not folded, the distance between antennas separated from each other may become close to each other due to folding of the electronic device 1300, and thus may have interference therebetween. As described above, when the electronic device 1300 is folded, it is difficult to secure antenna separation and, accordingly, the output signal of the Tx path may flow into the Rx chain. The processor (for example, the processor 120 of FIG. 1) may detect folding and/or a folding angle of the electronic device 1300 through a proximity sensor (for example, the sensor module 176 of FIG. 1) located in the electronic device 1300.

The electronic device 101, 300, 900, 1000, or 1300 according to various embodiments may include a transceiver 320, 400, 920, or 1020, a communication module (or, communication circuit) 190 or 200, at least one antenna module 335, 345, 355, or 365, the processor 120, and the memory 130. The transceiver 320, 400, 920, or 1020 may include at least one transmission (Tx) chain 410 and at least one reception (Rx) chain 420. The communication module (or, communication circuit) 190 or 200 may include a plurality of front ends 330, 340, 350, 360, 337, 347, 357, and 367 electrically connected, directly or indirectly, to the transceiver 320, 400, 920, or 1020. The at least one antenna module 335, 345, 355, and 365 may be connected to the plurality of front ends 330, 340, 350, 360, 337, 347, 357, and 367. The processor 120 may be operatively connected, directly or indirectly, to the communication module (or, communication circuit) 190 or 200. The memory 130 may be operatively connected, directly or indirectly, to the processor 120. The memory 130 may cause the processor 120 to, when executed, change power of the at least one reception (Rx) chain 420 and/or change circuit driving on the basis of the strength of the output signal of the at least one transmission chain 410.

When the strength of the output signal of the transmission chain 410 of the first front end 330, 340, 350, 360, 337, 347, 357, or 367 among the plurality of front ends 330, 340, 350, 360, 337, 347, 357, and 367 is smaller than the preset first reference value, the processor 120 of the electronic device according to various embodiments may lower the voltage drain (VDD) voltage value of the low-noise amplifier 422 included in the at least one reception chain 420.

When the electronic device 101, 300, 900, 1000, or 1300 is folded, the processor 120 may configure a second reference value smaller than the first reference value. When the strength of the output signal of the transmission chain 410 of the first front end 330, 340, 350, 360, 337, 347, 357, or 367 close to the second front end 330, 340, 350, 360, 337, 347, 357, or 367 among the plurality of front ends 330, 340, 350, 360, 337, 347, 357, and 367 is equal to or smaller than the second reference value, the VDD voltage value of the low-noise amplifier 422 included in the at least one reception chain 420 may be lowered.

When the strength of the output signal of the transmission chain 410 of the first front end 330, 340, 350, 360, 337, 347, 357, or 367 among the plurality of front ends 330, 340, 350, 360, 337, 347, 357, and 367 is equal to or smaller than the preset first reference value, the processor 120 of the electronic device according to various embodiments may lower the voltage value of the local oscillator (LO) of the mixer 424 included in the at least one reception chain 420.

When the electronic device 101, 300, 900, 1000, or 1300 is folded, the processor 120 may configure a second reference value smaller than the first reference value. When the strength of the output signal of the transmission chain 410 of the first front end 330, 340, 350, 360, 337, 347, 357, or 367 close to the second front end 330, 340, 350, 360, 337, 347, 357, or 367 among the plurality of front ends 330, 340, 350, 360, 337, 347, 357, and 367 is equal to or smaller than the second reference value, the voltage value of the LO 424a of the mixer 424 included in the at least one reception chain 420 may be lowered.

When the strength of the output signal of the transmission chain 410 of the first front end 330, 340, 350, 360, 337, 347, 357, or 367 among the plurality of front ends 330, 340, 350, 360, 337, 347, 357, and 367 is equal to or smaller than the preset first reference value, the processor 120 may turn off some of the plurality of active low pass filters 426b included in the at least one reception chain 420.

When the electronic device 101, 300, 900, 1000, or 1300 is folded, the processor 120 may configure a second reference value smaller than the first reference value. When the strength of the output signal of the transmission chain 410 of the first front end 330, 340, 350, 360, 337, 347, 357, or 367 close to the second front end 330, 340, 350, 360, 337, 347, 357, or 367 among the plurality of front ends 330, 340, 350, 360, 337, 347, 357, and 367 is equal to or smaller than the second reference value, some of the plurality of active low pass filters 426b included in the at least one reception chain 420 may be turned off.

When the strength of the output signal of the transmission chain 410 of the first front end 330, 340, 350, 360, 337, 347, 357, or 367 among the plurality of front ends 330, 340, 350, 360, 337, 347, 357, and 367 is larger than the preset first reference value, the processor 120 of the electronic device according to various embodiments may increase the VDD voltage value of the low-noise amplifier 422 included in the at least one reception chain 420 or maintain the initially configured voltage value.

When the strength of the output signal of the transmission chain 410 of the first front end 330, 340, 350, 360, 337, 347, 357, or 367 among the plurality of front ends 330, 340, 350, 360, 337, 347, 357, and 367 is larger than the preset first reference value, the processor 120 of the electronic device according to various embodiments may increase the voltage value of the LO 424A of the mixer 424 included in the at least one reception chain 420 or maintain the initially configured voltage value.

When the strength of the output signal of the transmission chain 410 of the first front end 330, 340, 350, 360, 337, 347, 357, or 367 among the plurality of front ends 330, 340, 350, 360, 337, 347, 357, and 367 is larger than the preset first reference value, the processor 120 of the electronic device according to various embodiments may turn on the plurality of active low pass filters 426b included in the at least one reception chain 420.

The electronic device 101, 300, 900, 1000, or 1300 according to various embodiments may further include a front end (for example, the Wi-Fi module 970 of FIG. 9) for short-range communication configured to support Wi-Fi and/or Bluetooth communication. When the front end (for example, the Wi-Fi module 970 of FIG. 9) for short range communication operates, the processor 120 may up control the VDD voltage value of the low-noise amplifier 422 included in the reception chain 420 of the transceiver 320, 400, 920, or 1020 connected to the second front end 330, 340, 350, 360, 337, 347, 357, or 367 close to the front end (for example, the Wi-Fi module 970 of FIG. 9) for short-range communication among the plurality of front ends 330, 340, 350, 360, 337, 347, 357, and 367.

The electronic device 101, 300, 900, 1000, or 1300 according to various embodiments may further include a front end (for example, the Wi-Fi module 970 of FIG. 9) for short-range communication configured to support Wi-Fi and/or Bluetooth communication. When the front end (for example, the Wi-Fi module 970 of FIG. 9) for short range communication operates, the processor 120 may up control the voltage value of the local oscillator of the mixer 424 included in the reception chain 420 of the transceiver 320, 400, 920, or 1020 connected to the second front end 330, 340, 350, 360, 337, 347, 357, or 367 close to the front end (for example, the Wi-Fi module 970 of FIG. 9) for short-range communication among the plurality of front ends 330, 340, 350, 360, 337, 347, 357, and 367.

The electronic device 101, 300, 900, 1000, or 1300 according to various embodiments may further include a front end (for example, the Wi-Fi module 970 of FIG. 9) for short-range communication configured to support Wi-Fi and/or Bluetooth communication. When the front end (for example, the Wi-Fi module 970 of FIG. 9) for short range communication operates, the processor 120 may turn on the plurality of active low pass filters 426b included in the reception chain 420 of the transceiver 320, 400, 920, or 1020 connected, directly or indirectly, to the second front end 330, 340, 350, 360, 337, 347, 357, or 367 close to the front end (for example, the Wi-Fi module 970 of FIG. 9) for short-range communication among the plurality of front ends 330, 340, 350, 360, 337, 347, 357, and 367.

The plurality of front ends 1030, 1040, 1050, and 1060 of the electronic device according to various embodiments may include a first front end 1030 configured to support transmission/reception of long-term evolution (LTE) communication and reception of 5G communication, a second front end 1040 configured to support the reception of the LTE communication and the reception of the 5G communication, a third front end 1050 configured to support the reception of the LTE communication and the transmission/reception of the 5G communication, and a fourth front end 1060 configured to support the reception of the LTE communication and the reception of the 5G communication. When similar frequency bands are used for the LTE communication and the 5G communication of the first front end 1030, the processor 120 may change power of the at least one reception chain 420 and change circuit driving on the basis of the strength of the output signal of the transmission chain 410 of the first front end 1030.

When the strength of the output signal of the transmission chain 410 of the LTE communication of the first front end 1030 is equal to smaller than a preset third reference value, the processor 120 of the electronic device may lower the VDD voltage of the low-noise amplifier 422 included in the at least one reception chain 420.

When the strength of the output signal of the transmission chain 410 of the LTE communication of the first front end 1030 is equal to smaller than a preset third reference value, the processor 120 of the electronic device may lower the voltage value of the local oscillator of the mixer 424 included in the at least one reception chain 420.

When the strength of the output signal of the transmission chain 410 of the LTE communication of the first front end 1030 is equal to smaller than a preset third reference value, the processor 120 of the electronic device may turn off some of the plurality of active low pass filters 426b included in the at least one reception chain 420.

When the strength of the output signal of the transmission chain 410 of the 5G communication of the first front end 1030 is equal to or smaller than a preset fourth reference value, the processor 120 of the electronic device according to various embodiments may lower the VDD voltage of the low-noise amplifier 422 included in the at least one reception chain 420.

When the strength of the output signal of the transmission chain 410 of the 5G communication of the first front end 1030 is equal to or smaller than the preset fourth reference value, the processor 120 of the electronic device according to various embodiments may lower the VDD voltage of the low-noise amplifier 422 included in the at least one reception chain 420.

When the strength of the output signal of the transmission chain 410 of the 5G communication of the first front end 1030 is equal to or smaller than the preset fourth reference value, the processor 120 of the electronic device according to various embodiments may turn off some of the plurality of active low pass filters 426b included in the at least one reception chain 420.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via at least a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC). Thus, each "module" herein may comprise circuitry.

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor(e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various example embodiments may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been illustrated and described with reference to various embodiments, it will be understood that the various embodiments are intended to be illustrative, not limiting. It will further be understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

The invention claimed is:

1. An electronic device comprising:
    a transceiver comprising at least one transmission path and at least one reception path, wherein the at least one reception path comprises a plurality of filters;
    a first front-end circuit electrically connected with the transceiver and comprising a power amplifier (PA) electrically connected with the at least one transmission path; and
    a first antenna module electrically connected with the first front-end circuit,
    wherein, in response to a strength of a signal outputted from the PA being equal to or smaller than a first reference value, at least one filter among the plurality of filters is turned off.

2. The electronic device of claim 1, wherein, in response to the strength of the signal is being equal to or smaller than the first reference value, a value of a voltage supplied to a low-noise amplifier comprised in the at least one reception path decreases.

3. The electronic device of claim 2, further comprising:
    at least one processor; and
    memory storing instructions that, when executed by the at least one processor individually or collectively, cause the electronic device to:
    in response to the electronic device being folded, identify a second reference value smaller than the first reference value, and
    in response to the strength of the signal outputted from the PA comprised in the first front-end circuit being equal to or smaller than the second reference value, decrease the value of the voltage supplied to the low-noise amplifier comprised in the at least one reception path,
    wherein the first front-end circuit is adjacent to a second front-end circuit.

4. The electronic device of claim 1, wherein, in response to the strength of the signal outputted from the PA comprised in the first front-end circuit being equal to or smaller than the first reference value, a value of a voltage supplied to of a local oscillator (LO) electrically connected with a mixer comprised in the transceiver decreases.

5. The electronic device of claim 4, further comprising:
    at least one processor; and
    memory storing instructions that, when executed by the at least one processor individually or collectively, cause the electronic device to:
    in response to the electronic device being folded, identify a second reference value smaller than the first reference value, and
    in response to the strength of the signal outputted from the PA comprised in the first front-end circuit being equal to or smaller than the second reference value, decrease the value of the voltage supplied to the LO electrically connected with the mixer comprised in the transceiver, wherein the first front-end circuit is adjacent to a second front-end circuit.

6. The electronic device of claim 1, further comprising:
at least one processor; and
memory storing instructions that, when executed by the at least one processor individually or collectively, cause the electronic device to:
in response to the electronic device being folded, identify a second reference value smaller than the first reference value, and
in response to the strength of the signal outputted from the PA comprised in the first front-end circuit being equal to or smaller than the second reference value, turn off the at least one filter among the pluraltiy of filters,
wherein the first front-end circuit is adjacent to a second front-end circuit.

7. The electronic device of claim 1, wherein, in response to the strength of the signal being greater than the first reference value, a value of a voltage supplied to a low-noise amplifier electrically connected with the at least one reception path increases or a value of an initially configured voltage is maintained.

8. The electronic device of claim 1, wherein, in response to the strength of the signal being greater than the first reference value, a value of a voltage supplied to local oscillator (LO) electrically connected withof a mixer included in the transceiver increases or an initially configured voltage value is maintained.

9. The electronic device of claim 1, wherein, in response to the strength of the signal being greater than the first reference value, the pluraltiy of filters are turned on.

10. The electronic device of claim 1, further comprising:
a third front-end circuit for supporting a Wi-Fi communication and/or a Bluetooth communication,
wherein, in case that the third front-end circuit operates, a value of a voltage supplied to a low-noise amplifier comprised in a second front-end circuit adjacent to the third front-end circuit increases.

11. The electronic device of claim 1, further comprising:
a third front-end circuit for supporting a Wi-Fi communication and/or a Bluetooth communication,
wherein, in case that the third front-end circuit operates, a value of a voltage supplied to a local oscillator (LO) electrically connected withof a mixer comprised in the transceiver increases, and
wherein the transceiver is eletrically connected with a second front-end circuit adjacent to the third front-end circuit.

12. The electronic device of claim 1, further comprising:
a third front-end circuit for supporting a Wi-Fi communication and/or a Bluetooth communication,
wherein, in case that the third front-end circuit operates, a plurality of filters electrcially connected with a second front-end circuit adjacent to the third front-end circuit are turned on.

13. The electronic device of claim 1, further comprising:
a plurality of front-end circuits including the first front-end circuit and a second front-end circuit,
wherein, in case that a first frequency band supported by the first front-end circuit and a second frequency band supported by the second front-end circuit are adjacent or at least paritally overlap, a value of a voltage supplied to a low noise amplifier connected with the at least one reception path is changed, based on the strength of the signal.

14. The electronic device of claim 13, wherein, in response to a strength of the signal for a long term evolution (LTE) communication being equal to or smaller than a third reference value, a value of a voltage supplied to a low-noise amplifier electrically connected with the at least one reception path decreases.

15. A method of operating an electronic device, the method comprising:
identifying that a strength of a signal output from a power amplifier (PA) electrically connected with at least one transmission path is equal to or smaller than a first reference value; and
turning off at least one filter among a plurality of filters,
wherein a transceiver of the electronic device comprises the at least one transmission path and at least one reception path,
wherein the at least one reception path comprises the plurality of filters,
wherein a first front-end circuit of the electronic device is electrically connected with the transceiver and comprises the PA, and
wherein a first antenna module of the electronic device is electrically connected with the first front-end circuit.

16. The method of claim 15, further comrpsing:
in response to the strength of the signal being equal to or smaller than the first reference value, decreasing a value of a voltage supplied to a low-noise amplifier included in the at least one reception path.

17. The method of claim 16, further comprising:
in response to the electronic device being folded, identifying a second reference value smaller than the first reference value, and
in response to the strength of the signal of the transmission chain of the being equal to or smaller than the second reference value, decreasing the value of the voltage supplied to the low-noise amplifier included in the at least one reception path.

18. The method of claim 15, further comprising:
in response to the strength of the signal being equal to or smaller than the first reference value, decreasing a value of a voltage supplied to a local oscillator (LO) electrically connected with a mixer comprised in the transceiver.

19. The method of claim 18, further comprisng:
in response to the electronic device being folded, identifying a second reference value smaller than the first reference value, and
in response to the strength of the signal being equal to or smaller than the second reference value, decreasing the value of the voltage supplied to.

* * * * *